United States Patent
Sunwoo et al.

(10) Patent No.: US 11,966,785 B2
(45) Date of Patent: Apr. 23, 2024

(54) HARDWARE RESOURCE CONFIGURATION FOR PROCESSING SYSTEM

(71) Applicant: Arm Limited, Cambridge (GB)

(72) Inventors: Dam Sunwoo, Austin, TX (US); Supreet Jeloka, Austin, TX (US); Saurabh Pijuskumar Sinha, Schertz, TX (US); Jaekyu Lee, Austin, TX (US); Jose Alberto Joao, Austin, TX (US); Krishnendra Nathella, Austin, TX (US)

(73) Assignee: Arm Limited, Cambridge (GB)

( * ) Notice: Subject to any disclaimer, the term of this patent is extended or adjusted under 35 U.S.C. 154(b) by 738 days.

(21) Appl. No.: 16/943,117

(22) Filed: Jul. 30, 2020

(65) Prior Publication Data

US 2022/0035679 A1 Feb. 3, 2022

(51) Int. Cl.
*G06F 9/46* (2006.01)
*G06F 9/50* (2006.01)
(Continued)

(52) U.S. Cl.
CPC .......... *G06F 9/5044* (2013.01); *G06F 9/5038* (2013.01); *G06F 9/505* (2013.01); *G06N 5/04* (2013.01); *G06N 20/00* (2019.01)

(58) Field of Classification Search
CPC ...... G06F 9/5044; G06F 9/5038; G06F 9/505; G06F 9/5005; G06N 20/00; G06N 5/04
See application file for complete search history.

(56) References Cited

U.S. PATENT DOCUMENTS

| 8,243,086 B1 * | 8/2012 | Diard | H04N 19/91 |
| | | | 345/426 |
| 2009/0172683 A1 * | 7/2009 | Lin | G06F 9/505 |
| | | | 718/103 |

(Continued)

FOREIGN PATENT DOCUMENTS

CN 110647390 A * 1/2020 ........... G06F 9/4881

OTHER PUBLICATIONS

A.C. Aldaya et al, "Port Contention for Fun and Profit" *Proceedings of the 40th IEEE Symposium on Security and Privacy (S&P)*, May 19-23, 2019, 18 pages.
(Continued)

*Primary Examiner* — Emerson C Puente
*Assistant Examiner* — Zhi Chen
(74) *Attorney, Agent, or Firm* — NIXON & VANDERHYE P.C.

(57) ABSTRACT

A method for controlling hardware resource configuration for a processing system comprises obtaining performance monitoring data indicative of processing performance associated with workloads to be executed on the processing system, providing a trained machine learning model with input data depending on the performance monitoring data; and based on an inference made from the input data by the trained machine learning model, setting control information for configuring the processing system to control an amount of hardware resource allocated for use by at least one processor core. A corresponding method of training the model is provided. This is particularly useful for controlling inter-core borrowing of resource between processor cores in a multi-core processing system, where resource is borrowed between respective cores, e.g. cores on different layers of a 3D integrated circuit.

20 Claims, 13 Drawing Sheets

(51) Int. Cl.
G06N 5/04 (2023.01)
G06N 20/00 (2019.01)

(56) References Cited

U.S. PATENT DOCUMENTS

| | | | | |
|---|---|---|---|---|
| 2012/0203523 | A1* | 8/2012 | Tan | G06T 15/005 |
| | | | | 703/2 |
| 2018/0349189 | A1* | 12/2018 | Rossi | G06F 9/50 |
| 2019/0004858 | A1* | 1/2019 | Bernat | H04W 8/22 |
| 2019/0205741 | A1* | 7/2019 | Gupta | G06F 17/13 |
| 2020/0371959 | A1* | 11/2020 | Gupta | G06F 12/0857 |
| 2020/0379809 | A1* | 12/2020 | Yudanov | G06N 3/045 |

OTHER PUBLICATIONS

A. Pellegrini et al, Arm, "The Arm Neoverse N1 Platform: Building Blocks for the Next-Gen Cloud-to-Edge Infrastructure Soc" *IEEE Computer Society* Feb. 7, 2020, https://www.arm.com/products/siliconip-cpu/neoverse/neoverse-n1, 2019, pp. 53-62.

B. Black et al., "Die Stacking (3D) Microarchitecture" *The 39th Annual IEEE/ACM International Symposium on Microarchitecture (MICRO'06)*, Dec. 9-13, 2006, 11 pages.

P. Emma et al., "3D Stacking of High-Performance Processors" *Proceedings of the 20th IEEE International Symposium on High-Performance Computer Architecture (HPCA)*, Feb. 15-19, 2014, pp. 1-12.

J. Feliu et al., "Addressing Fairness in SMT Multicores with a Progress-Aware Scheduler" *29th IEEE International Parallel & Distributed Processing Symposium (IPDPS 2015)*, May 25-29, 2015, 11 pages.

C.M. Fiduccia et al., "A Linear-Time Heuristic for Improving Network Partitions" *19th Design Automation Conference*, Paper 13.1, Jun. 14-16, 1982, pp. 175-181.

B. Gopireddy et al., "Designing Vertical Processors in Monolithic 3D" *Proceedings of the 46th Annual International Symposium on Computer Architecture (ISCA)*, Jun. 22-26, 2019, 14 pages.

M.D. Hill et al., "Amdahl's Law in the Multicore Era" *Computer*, vol. 41, Issue 7, Jul. 2008, p. 33-38.

H. Homayoun et al., "Dynamically Heterogeneous Cores Through 3D Resource Pooling" *18th International Symposium on High Performance Computer Architecture*, Feb. 2012, 12 pages.

E. Ipek et al., "Core Fusion: Accommodating Software Diversity in Chip Multiprocessors" *Proceedings of the 34th Annual International Symposium on Computer Architecture (ISCA)*, Jun. 9-13, 2007, 12 pages.

A. Karandikar et al., "Low Power SRAM Design using Hierarchical Divided Bit-Line Approach" *Proceedings of the 16th IEEE International Conference on Computer Design (ICCD)*, Oct. 5-7, 1998, 7 pages.

Khubaib, "MorphCore: An Energy-Efficient Microarchitecture for High Performance ILP and High Throughput TLP" *2012 IEEE/ACM 45th Annual International Symposium on Microarchitecture*, Dec. 1-5, 2012, pp. 305-316.

C. Kim et al, "Composable Lightweight Processors" *Proceedings of the 40th Annual IEEE/ACM International Symposium on Microarchitecture (MICRO)*, Dec. 2007, 13 pages.

R. Kumar et al, "Single-ISA Heterogeneous Multi-Core Architectures: The Potential for Processor Power Reduction" *Proceedings of the 36th International Symposium on Microarchitecture (MICRO-36 2003)*, Dec. 5, 2003, 12 pages.

G.H. Loh, "3D-Stacked Memory Architectures for Multi-Core Processors" *Proceedings of the 35th ACM/IEEE International Conference on Computer Architecture*, Jun. 2008, pp. 1-14.

P. Michaud et al, "Revisiting clustered microarchitecture for future superscalar cores: a case for wide-issue clusters" *ACM Transactions on Architecture and Code Optimization*, vol. 12, No. 3, Aug. 2015, 23 pages.

J. Mukundan et al, "Overcoming Single-Thread Performance Hurdles in the Core Fusion Reconfigurable Multicore Architecture" *Proceedings of the 26th ACM International Conference on Supercomputing (ICS)*, Jun. 25-29, 2012, 10 pages.

S. Palacharla et al, "Complexity-Effective Superscalar Processors" *Proceedings of the 24th Annual International Symposium on Computer Architecture (ISCA)*, May 1997, pp. 206-218.

E. Perelman et al, "Using SimPoint for Accurate and Efficient Simulation" *Proceedings of the 2003 ACM SIGMETRICS International Conference on Measurement and Modeling of Computer Systems (SIGMETRICS)*, Jun. 10-14, 2003, 2 pages.

D. Ponomarev et al, "Dynamic Resizing of Superscalar Datapath Components for Energy Efficiency" *IEEE Transactions on Computers*, vol. 55, No. 2, Feb. 2006, pp. 199-213.

G.S. Ravi et al, "CHARSTAR: Clock Hierarchy Aware Resource Scaling in Tiled Architectures" *Proceedings of the 44th Annual International Symposium on Computer Architecture (ISCA)*, Jun. 24-28, 2017, 14 pages.

J. Read et al, "Classifier chains for multi-label classification" *Machine Learning*, vol. 85, No. 3, Jun. 2011, pp. 333-359.

E. Rotenberg et al, "Rationale for a 3D Heterogeneous Multi-core Processor" *Proceedings of the 31st IEEE International Conference on Computer Design (ICCD)*, Oct. 6-9, 2013, 15 pages.

H. Sayadi et al, "Machine Learning-Based Approaches for Energy-Efficiency Prediction and Scheduling in Composite Cores Architectures" *2017 IEEE 35th International Conference on Computer Design*, Nov. 2017, pp. 129-136.

S. Sinha et al, "Stack up your chips: Betting on 3D integration to augment Moores Law scaling" *2019 IEEE SOI-3D-Subthreshold Microelectronics Technology Unified Conference (S3S)*, Oct. 2019, 5 pages.

S. V. Stehman, "Selecting and Interpreting Measures of Thematic Classification Accuracy" *Remote Sensing of Environment (RSE)*, vol. 62, Oct. 1997, pp. 77-89.

S.J. Tarsa et al, "Post-Silicon CPU Adaptation Made Practical Using Machine Learning" *Proceedings of the 46th Annual International Symposium on Computer Architecture (ISCA)*, Jun. 22-26, 2019, pp. 14-26.

M.K. Tavana et al, "ElasticCore: Enabling Dynamic Heterogeneity with Joint Core and Voltage/Frequency Scaling" *Proceedings of the 52nd Annual Design Automation Conference (DAC)*, Jun. 8-12, 2015, 6 pages.

D.M. Tullsen et al, "Simultaneous Multithreading: Maximizing On-Chip Parallelism" *Proceedings of the 22nd Annual International Symposium on Computer Architecture (ISCA)*, May 1995, pp. 533-544.

B. Vaidyanathan et al, "Architecting Microprocessor Components in 3D Design Space" *20th International Conference on VLSI Design (VLSID'07)*, Jan. 6-10, 2007, 6 pages.

X. Xu et al, "Enhanced 3D Implementation of an Arm® Cortex®—A Microprocessor" *2019 IEEE/ACM International Symposium on Low Power Electronics and Design (ISLPED)*, Jul. 2019, 6 pages.

T. Zhang et al, "Dynamic Cache Pooling in 3D Multicore Processors" *ACM Journal on Emerging Technologies in Computing Systems*, vol. 1, No. 1, Article 1, Sep. 2015, pp. 1-20.

H. Zhong et al, "Extending Multicore Architectures to Exploit Hybrid Parallelism in Single-thread Applications" *2007 IEEE 13th International Symposium on High Performance Computer Architecture*, Feb. 2007, pp. 25-36.

N. Stephens et al, "The ARM Scalable Vector Extension" *IEEE Micro*, vol. 37, Issue 2, Mar.-Apr. 2017, pp. 1-8.

M. Pericas et al, "A Flexible Heterogeneous Multi-Core Architecture" *16th International Conference on Parallel Architecture and Compilation Techniques*, Oct. 2007, pp. 13-24.

S. Naffziger et al, "2.2 AMD Chiplet Architecture for High-Performance Server and Desktop Products" *2020 IEEE International Solid-State Circuits Conference—(ISSCC)*, Feb. 2020, 2 pages.

R. Rodrigues et al, "Performance Per Watt Benefits of Dynamic Core Morphing in Asymmetric Multicores" *2011 International Conference on Parallel Architectures and Compilation Techniques*, Oct. 10-14, 2011, 10 pages.

(56) References Cited

OTHER PUBLICATIONS

D. Tarjan et al, "Federation: Repurposing Scalar Cores for Out-of-Order Instruction Issue" *2008 45th ACM/IEEE Design Automation Conference,* Jun. 8-13, 2008, 4 pages.
A. Lukefahr et al, "Composite Cores: Pushing Heterogeneity into a Core" *2012 45th Annual IEEE/ACM international symposium on microarchitecture,* Dec. 1-5, 2012, 12 pages.
Y. Watanabe et al, "WiDGET: Wisconsin Decoupled Grid Execution Tiles" *ACM SIGARCH Computer Architecture News,* Jun. 19-23, 2010, pp. 2-13.
S. Srinivasan et al, "A Study on Polymorphing Superscalar Processor Dynamically to Improve Power Efficiency" *2013 IEEE Computer Society Annual Symposium on VLSI,* Aug. 2013, pp. 46-51.
M. Pricopi et al, "Bahurupi: A Polymorphic Heterogeneous Multi-Core Architecture" *ACM Transactions on Architecture and Code Optimization,* vol. V, No. N, Article A, Jan. 2012, 20 pages.
J. Bagherzadeh et al, "3DFAR: A Three-Dimensional Fabric for Reliable Multi-Core Processors" *Design, Automation & Test in Europe Conference & Exhibition,* Mar. 2017, 4 pages.
K. Kang et al, "A Power-Efficient 3-D On-Chip Interconnect for Multi-Core Accelerators with Stacked L2 Cache" *2016 Design, Automation & Test in Europe Conference & Exhibition,* Mar. 14-18, 2016, p. 1465-1468.
J-C Chiu et al, "Hyperscalar: A Novel Dynamically Reconfigurable Multi-core Architecture" *2010 39$^{th}$ International Conference on Parallel Processing,* Sep. 13-16, 2020, pp. 277-286.
J. Kim et al, "Architecture, Chip, and Package Co-design Flow for 2.5D IC Design Enabling Heterogeneous IP Reuse" *Proceedings of the 56th Annual Design Automation Conference 2019,* Jun. 2019, 6 pages.
R. Christy et al, "8.3 A 3GHZ Arm Neoverse N1 CPU in 7nm FinFET for Infrastructure Applications." *2020 IEEE International Solid-State Circuits Conference—(ISSCC),* Feb. 16-20, 2020, 3 pages.
C. Fallin et al, "The Heterogeneous Block Architecture" *2014 IEEE 32nd International Conference on Computer Design (ICCD),* Oct. 19-22, 2014, pp. 1-8.
J.A. Joao et al, "Bottleneck Identification and Scheduling in Multithreaded Applications" *Proceedings of the 17$^{th}$ International Conference on Architectural Support for Programming Languages and Operating Systems,* Mar. 3-7, 2012, pp. 1-12.
J.A. Joao et al, "Utility-Based Acceleration of Multithreaded Applications on Asymmetric CMPs" *ACM SIGARCH Computer Architecture News,* Jun. 2013, 12 pages.
R. Kumar et al, "Conjoined-core Chip Multiprocessing" *Proceedings of the 37$^{th}$ International Symposium on Microarchitecture (MICRO-37 2004),* Dec. 4-8, 2004, pp. 1-12.
S. Gupta et al, "Erasing Core Boundaries for Robust and Configurable Performance" *2010 43rd Annual IEEE/ACM International Symposium on Microarchitecture,* Dec. 2010, 12 pages.
P. Kocher et al, "Spectre Attacks: Exploiting Speculative Execution" *2019 IEEE Symposium on Security and Privacy (SP),* May 19-23, 2019, 19 pages.
H. Homayoun, "Dynamically Heterogeneous Cores Through 3D Resource Pooling", University of California San Diego, 18$^{th}$ International Symposium on High Performance Computer Architecture, Feb. 2012, 12 pages.
T. Zhang, "Dynamic Cache Pooling in 3D Multicore Processors", Boston University, ACM Journal on Emerging Technologies in Computing Systems, vol. 1, No. 1, Article 1, Pub. Date: Sep. 2015, 20 pages.

\* cited by examiner

US 11,966,785 B2

HARDWARE RESOURCE CONFIGURATION FOR PROCESSING SYSTEM

BACKGROUND

Technical Field

The present technique relates to the field of data processing.

Technical Background

A processing system may have one or more processor cores for performing data processing in response to instructions from an executed workload. Each processor core may have a certain set of hardware resources available to it for supporting instruction execution. For example the hardware resource may include execution units, pipeline slots for fetching, decoding or issuing instructions, instruction queue capacity or cache capacity to give just some examples.

SUMMARY

At least some examples provide a computer-implemented method for controlling hardware resource configuration for a processing system comprising at least one processor core; the method comprising:
  obtaining performance monitoring data indicative of processing performance associated with workloads to be executed on the processing system;
  providing input data to a trained machine learning model, the input data depending on the performance monitoring data; and
  based on an inference made from the input data by the trained machine learning model, setting control information for configuring the processing system to control an amount of hardware resource allocated for use by the at least one processor core.

At least some examples provide a computer-implemented training method for training a machine learning model for controlling hardware resource configuration for a processing system comprising at least one processor core; the method comprising:
  for each of a plurality of workloads or groups of workloads selected as a selected workload or selected group of workloads, performing a training operation comprising:
    obtaining performance monitoring data indicative of processing performance for the selected workload or selected group of workloads when processed in a plurality of different hardware resource configurations of at least one processor core, the plurality of hardware resource configurations including hardware resource configurations in which different amounts of hardware resource are made available for use when processing the selected workload or selected group of workloads;
    training the machine learning model to adapt model parameters for the machine learning model based on the performance monitoring data for the selected workload or selected group of workloads and the plurality of different hardware resource configurations; and
  recording trained model parameters for the machine learning model resulting from the training operation performed for the plurality of workloads or groups of workloads.

At least some examples provide a storage medium storing a computer program for controlling a processing system to perform either of the methods described above. The storage medium may be a non-transitory storage medium.

At least some examples provide a processing system comprising:
  at least one processor core;
  performance monitoring circuitry to obtain performance monitoring data indicative of processing performance associated with workloads to be executed on the processing system; and
  configuration control circuitry to set, based on an inference made by a trained machine learning model from input data depending on the performance monitoring data, control information for controlling an amount of hardware resource allocated for use by the at least one processor core.

Further aspects, features and advantages of the present technique will be apparent from the following description of examples, which is to be read in conjunction with the accompanying drawings.

DESCRIPTION OF EXAMPLES

Figure 1:
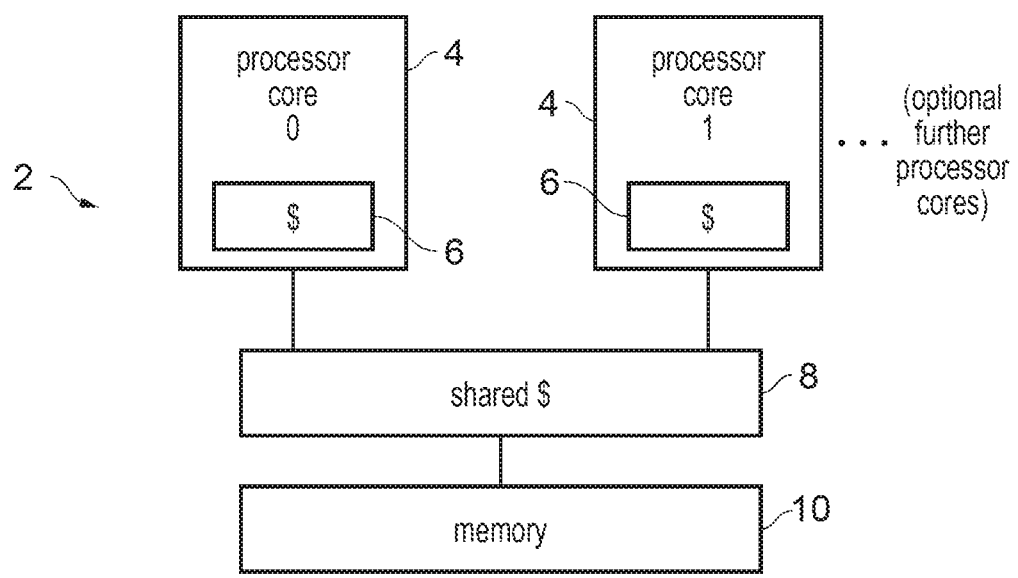
FIG. 1 illustrates an example of a multi-core processing system.

A processor core in a processing system may have a certain amount of hardware resource for supporting program execution. However, not all program workloads may fully utilise the hardware resource in the processor core that is executing that workload. A processor core may be provided with resource for dealing with certain workloads with relatively high performance needs, but sometimes may be executing programs which can operate acceptably with only a fraction of the hardware resource of the processor core.

However, deciding what subset of hardware resource should be allocated to a given processor can be difficult to control in practice. Whether a particular configuration of hardware resource allocation will provide sufficient performance may depend on the particular workloads being executed. Although an operating system or user program could be allowed to directly set hardware resource configuration parameters for controlling the hardware resource allocation for each processor, there may be a large number of parameters which could be adjusted and it may be difficult to know what the best set of parameters is for a given set of workloads.

In the techniques discussed below, a machine learning model is trained to learn how to set control information for configuring the processing system to control the amount of hardware resource allocated to at least one processor core. Performance monitoring data is obtained indicative of processing performance associated with workloads to be executed on the processing system. Input data is provided to the trained machine learning model, where the input data depends on the performance monitoring data. The trained machine learning model makes an inference based on the input data, and that inference is used to set the control information for configuring the amount of hardware resource allocated for use by the at least one processor core. Hence, the operating system or user does not need to make configuration decisions on how to control hardware resource allocation. By using a machine learning approach, patterns characterising which hardware resource configurations are appropriate for workloads with certain patterns of performance characteristics can be learnt automatically, even if those relationships are difficult for a human to understand or characterise. Hence, this may make it more likely that a suitable hardware resource configuration can be selected for executing a given workload or set of workloads, and hence boost average performance for the multi-core processing system.

The machine learning model could be used for controlling resource allocation in a system which only comprises a single core, or which comprises multiple cores but which does not support inter-core borrowing of resource. For example, a processor core may have a certain amount of hardware resource available, but if a workload executed on that core can operate with acceptable performance with only a fraction of that hardware resource, some of the hardware resource could be disabled to save power. The machine learning model can be used to predict what particular combinations of hardware resource enabling/disabling are suitable for a given workload, based on its performance monitoring data.

Hence, in one example, in at least one configuration selectable based on the inference made by the trained machine learning model, a first subset of hardware resource of a given processor core is allocated for use by the given processor core to execute workloads, and a second subset of hardware resource of the given processor core is not allocated for use by the given processor core to execute workloads. The unallocated second subset of hardware resource could be disabled or placed in a power saving state, for example.

However, the techniques discussed below can be particularly useful in a multi-core processing system comprising two or more processor cores. In particular, the techniques can be useful in a multi-core processing system which supports inter-core borrowing of resources, and so in this case the unallocated second subset of hardware resource of a given processor core could be reallocated for use by a different core which may have greater performance needs.

This recognises that if each of the cores in the multi-core processing system is resourced to handle the worst case performance needs then much of the time some of that hardware resource may be unutilised, which may waste the circuit area and power cost incurred in providing that resource. A multi-core processing system may support inter-core borrowing of hardware resource between processor cores, where a first processor core may process a workload using borrowed hardware resource that has been borrowed from a second processor core which does not need that hardware resource for executing its own workload. It may be relatively infrequent that the workloads on all the processor cores fully utilise the available resource, so by allowing a core executing a workload which has less demanding performance requirements to lend some of its resource to a processor core executing a more performance-intensive (resource-hungry) workload, this can allow the more resource-hungry workload to execute faster at little cost to the workload executing on the processor core from which the extra hardware resource was borrowed. Hence, inter-core borrowing of resource can boost performance for some groups of workloads running on the processor cores.

Hence, in some examples the control information set based on the inference made by the trained machine learning model may control an amount of inter-core borrowing of hardware resource between the plurality of processor cores.

In some examples, the input data for the trained machine learning model could comprise performance monitoring data associated with a single workload to be executed. Multiple separate inferences could then be made by the trained machine learning model for multiple different workloads, based on processing of separate sets of input data in multiple passes of the machine learning model, to provide separate predictions of single-core resource configurations which might be suitable for executing each particular workload. For example the trained machined learning model could provide an indication of which of a variety of hardware resource configurations may be suitable for the workload being predicted, where those hardware resource configurations may include some resource configurations where the processing is performed using less than the full set of hardware resource available to the single processor core and other configurations where the processing is performed using a greater amount of hardware resource than is actually supported in the single processor core (in anticipation that that additional resource can be borrowed from another processor core). Having generated separate predictions for each of the workloads, pairs or groups of workloads can then be selected for which the suitable hardware resource configurations predicted by the machine learning model are complementary so that they can be selected on different cores simultaneously. For example, a group of workloads can be paired together where one workload in the group is predicted to benefit from borrowing of resource and another workload in the group is predicted to run acceptably even if its processor core has given up that same borrowed resource to another core.

However, in another example, the trained machine learning model may be trained to process input data which depends on a first set of performance monitoring data corresponding to a first workload to be executed on a first processor core and a second set of performance monitoring data corresponding to a second workload to be executed on a second processor core, and could provide an inference which may directly indicate whether at least one hardware resource configuration for the combination of the first and second processor cores is suitable for executing the first and second workloads. Similarly, this could be expanded to making an inference about a suitable configuration of three or more cores for executing a group of three or more workloads, based on three or more sets of performance monitoring data for the three or more workloads. By performing the machine learning based on pairs or groups of workloads rather than individual workloads this can better account for dependencies between the workloads where borrowing hardware resource from another core may impact on performance at that other core. This approach also may simplify the processing for the operating system or other software which uses the inference from the machine learning model to set the control information, since a single pass of the trained machine learning model may provide the inference needed for setting resource configuration parameters for multiple cores, rather than needing multiple separate passes of the machine learning model for each individual core and then an analysis of whether configurations predicted in those passes are complementary.

The performance monitoring data may include one or more performance counter values which indicate counts of various types of events associated with processing of corresponding workloads. For example, performance counters could be provided for counting events such as cache misses, branch mispredictions, number of instructions executed in a given time period, etc. In some examples the absolute values of performance counters could be used to form at least part of the input data for the trained machine learning model. Hence, if the input data depends on first and second sets of performance monitoring data associated with first and second workloads, the array of input data may include the first set of counter values associated with the first workload and a second set of counter values associated with the second workload. Use of absolute counter values could be useful in examples where inter-core borrowing of resource is not supported, but where the machine learning model is used to control some hardware resource of a given processor core being disabled, as in this case each core's preferred configuration may not depend on workloads executed at other cores.

However, especially for examples where the machine learning model is used to control inter-core borrowing of resource, it has been found that higher accuracy in the predictions made by the machine learning model can be achieved if the input data comprises differences between the values of the performance counters for the different workloads. Hence, the input data for the trained machine learning model may comprise at least one event count difference value, with each event count difference value indicating a difference between corresponding performance counter values obtained for a first workload to be executed on a first processor core and a second workload to be executed on a second processor core. The higher accuracy is attributed to the recognition that resource borrowing can be particularly effective when the relative resource requirements between a pair or group of workloads indicate that the workloads have differing performance requirements, so the control of resource borrowing may depend less on the raw performance or statistics of the individual workloads, but may be more strongly correlated with the relative difference between the performance monitoring data obtained for the different workloads. For example, if a first workload requires more cache resources than a second workload, this would be reflected by the relative cache statistics (e.g. difference in number of cache misses or cache accesses). As a typical machine learning model does not know the meaning of the different items of input data provided to it, then if the absolute count values for the different workloads are input as separate items of training data, then the machine learning model does not know that those corresponding count values for the different workloads are more likely to be correlated than a counter of a first type and a counter of a different type counting a different type of performance event. In contrast, if the event count difference values are provided directly as an input to the model, then the choice of the input data format will guide the machine learning model towards considering differences in resource requirements by different workloads, so that it is more likely that the prediction accuracy can be improved.

The performance monitoring data used for forming the input data for the machine learning model could be obtained from different sources. In some examples the performance monitoring data could have previously been captured and stored in the memory of the processing system. For example sets of performance monitoring data for particular workloads could be supplied to the processing system along with the program code itself, e.g. having been gathered by executing the workload on another hardware device with similar hardware resource capabilities, or having been gathered by a computer simulation of the processing system executing the workload, where the simulation provides accurate simulation of the hardware resources of the processing system when processing instructions of the workload. Where the input data for the machine learning model depends on first and second sets of performance monitoring data for first and second workloads, the first and second sets of performance monitoring data could be obtained in a single run of execution where the first and second workloads are executed in parallel on a multi-core processing system or a simulation, or could be gathered separately with the first set of performance monitoring data obtained in a first execution run involving execution of the first workload, and the second set of performance monitoring data obtained in a second execution run involving execution of the second workload. The performance monitoring data used as input data for the machine learning model could be obtained based on execution of the workload(s) in a certain default configuration of hardware resources, e.g. a base configuration in which there is no inter-core borrowing of resource.

However, a more accurate prediction can be made if the performance monitoring data is gathered at runtime when workloads are actually executed on the processing system itself. Hence, the processing system may have performance monitoring circuitry which can gather the performance monitoring data during execution of workloads, so as to generate the performance monitoring data for informing future decisions on configuring the hardware resources available for executing that workload. The processing system may for example comprise a number of event counters which can be configured to count particular types of event during the execution of a given workload.

In one example, each event counter may provide a register which can be read by software to obtain the event count value which indicates how many events of a corresponding type have occurred. In this case the event count registers may provide absolute values of event counters. If it is desired to provide input data for the trained machine learning model which comprises an event count difference value, then this difference value could be calculated in software by subtracting the corresponding event counters associated with different processor cores executing different workloads. However, there may be a large number of different types of performance events to be counted and subtraction may be a relatively slow operation and so with this approach it may take some time for the software to obtain the input data.

Therefore, in some examples the at least one event count difference value may be read from at least one event count difference storage element provided in hardware in the processing system, which may directly indicate the at least one event count difference value without software having to calculate the difference. Hardware circuit logic may be provided to maintain the at least one event count difference value stored in the at least one count difference storage element. With this approach, the event count differences to be used to form the input data for the machine learning model can be read directly from hardware registers and so this avoids the need for as much software processing, speeding up the algorithm for generating the inference using the machine learning model.

In one example, the hardware circuit logic for maintain the at least one event count difference value could be at least one subtractor (e.g. an adder with one of the inputs negated) implemented in hardware which receives the absolute performance count values of corresponding performance count registers in respective processor cores and obtains the difference. However, many performance counters may be relatively long (e.g. up to 64 bits), and so the subtractors could cause a relatively high area and latency overhead.

Another approach is that the hardware circuit logic could comprise a set of incrementers or decrementers which directly increment or decrement the at least one count difference value in response to the event occurrence signals which signal the occurrence of performance events of a given type in the respective processor cores. For example, for a register tracking the event count difference value signalling the difference between corresponding performance counter values at the first and second processor cores, then if the event of the type to be counted occurs in one of the first and second processor cores, an incrementer may increment the corresponding event count difference value, and if the corresponding type of event occurs for the other of the first and second processor cores then a decrementer may decrement the event count difference value. The signals triggering the increment or decrement of the difference counter may be the same signals which would trigger incrementing the respective absolute performance counter registers in the respective cores, but there may be extra wiring to route the event occurrence signals from one core to another core for the purpose of maintaining a difference counter. With this approach, a more hardware efficient method of tracking the event count differences may be possible.

Hence, in some implementations the performance monitoring circuitry of the multi-core system may comprise at least one difference performance counter to maintain a performance count different value indicative of a difference between a number of events of a given type occurring for the first processor core and a number of events of the given type occurring for the second processor core.

Although training the machine learning model and making inferences based on input data depending on event count differences can provide greater accuracy, in some examples the input data could also include at least one event count magnitude value indicative of a magnitude of at least one of the corresponding performance counter values for which the difference is represented by the event count difference value. For example the event count magnitude value could indicate values of a certain number of most significant bits of one of the performance counter values whose difference is represented by the event count difference value. In some scenarios it may be useful for the model to be provided with an indication of magnitude of the performance counters as well as their difference, because the difference alone would not distinguish a situation where the difference between performance counters is a certain value but both workloads are relatively performance-hungry compared to a situation where the difference value has the same value but both workloads are more performance-light and do not need as much resource—these scenarios may have different needs for hardware resource allocation or inter-core borrowing of resource. By providing an indication of magnitude of the performance counter values as well as the difference this can enable more careful decisions on resource configuration. The model input data may therefore depend on both the event count difference value and at least part of the absolute value for the corresponding performance counter values.

The method may comprise selecting a group of workloads to execute in parallel on respective processor cores of the processing system, based on at least one selection criterion which favours grouping together of workloads for which the performance monitoring data indicates that the workloads have differing performance or resource utilisation requirements. In some cases, if the machine learning model processes performance monitoring data for a single workload at a time, then the workload selection step may be performed after generating the inferences using separate passes of the machine learning model for each workload, and then the selection step may group workloads together for which the inferences indicate that different complementary hardware resource configurations of the respective processor cores are suitable for those workloads.

However, in a machine learning implementation where the machine learning model processes performance monitoring data for multiple workloads so as to provide an inference indicating an appropriate resource configuration across two or more processor cores, it can be useful to perform the workload group selection step before the machine learning model is invoked, so as to pre-emptively group workloads together for which the performance or resource utilisation requirements are expected to be different, when forming the input data for the machine learning model which depends on performance monitoring data for a group of workloads. For example an initial pass of the performance monitoring data may allow general performance or resource utilisation requirements of the workloads to be identified, or alternatively the requirements of workloads may previously have been identified and represented using data stored in memory which can be used as inputs to the workload selection step.

One example of workloads with differing performance or resource utilisation requirements may be a compute-bound workload and a memory-bound workload.

A compute-bound workload has its performance limited more by restrictions on instruction throughput in a processing pipeline than by restrictions on cache capacity or memory bandwidth. For example a compute-bound workload may be a workload with relatively few memory operations per arithmetic/logical operation, or with a relatively small working set of addresses so that most memory operations hit in a cache. This means a compute-bound workload may have a relatively high instruction throughput, and so the limits on the performance achieved may be caused by restrictions on how much resource is available within the processing pipeline for processing instructions, e.g. the number of execution units, instruction slots or instruction queue entries, or in an out-of-order processor the number of slots within a reorder buffer which defines the size of the out of order lookahead window within which a younger instruction program order may bypass an older instruction and be executed ahead of the older instruction. For example, compute-bound workloads could be identified as workloads for which the number of instructions executed per cycle when executed in a certain base hardware resource configuration is greater than a particular threshold.

On the other hand, a memory-bound workload may be a workload for which the performance is limited more by restrictions on cache capacity or memory bandwidth rather than by restrictions on pipeline resource available for instructions. If a workload has a larger working set of addresses or has a greater frequency of memory accesses per arithmetic/logical operation, there may be more frequent cache misses and hence longer memory latency when accessing memory, which can cause dependent instructions to stall even if there is sufficient pipeline resource for processing those instructions. Hence, even if more resource was provided to support execution of additional instructions in the pipeline, that resource might not be utilised because there may be no instructions to execute which can proceed if the instructions are still waiting for data dependent on a load from memory. Hence, a memory-bound workload can benefit from being granted additional resource such as cache capacity, load/store queue capacity or translation lookaside buffer capacity, but may not benefit as much from being granted additional execution units or pipeline processing slots compared to a compute-bound workload. For example, a memory-bound workload could be identified as a workload for which a cache miss metric (or other metric depending on latency or frequency of memory operations) exceeds a threshold.

Hence, by providing at least one selection criterion which favours selecting the group of workloads to include a combination of at least one compute-bound workload and at least one memory-bound workload, it can be more likely that a hardware resource configuration of multiple processor cores which involves inter-core borrowing of hardware resource can be found which will improve performance for the group of workloads compared to a base configuration in which there is no inter-core borrowing. For example a suitable hardware resource for such a combination of workloads could include a first processor core borrowing pipeline slots or execution units from a second core and the second core borrowing cache capacity from the first core so that a compute-bound workload on the first core and a memory-bound workload on the second core can operate more efficiently.

Other examples of workloads for which performance requirements are different and so asymmetric allocation of resources can be beneficial could include one or more of:
programs with different lengths of dependency chain—
  programs with long dependency chains (number of subsequent instructions which depend on an earlier instruction) may have intrinsically low instruction-level parallelism and so may not benefit from a "larger" core as much as programs with shorter dependency chains;
programs with many branch mispredictions may have their own preferred core configurations (e.g. larger capacity of branch prediction state storage) which may differ from programs encountering fewer branch mispredictions.

Hence, compute-bound and memory-bound workloads are not the only example of different types of workloads which could be identified and grouped together.

In summary, if a preliminary step of grouping workloads with differing performance requirements is performed when selecting which workloads should execute in parallel, this can increase the fraction of available core-group hardware resource configurations (i.e. the combination of settings for resources across a whole group of cores) that may be predicted by the machine learning model as being suitable for executing that group of workloads, giving more opportunities for performance improvement compared to if the machine learning model was provided with input data relating to randomly selected groups of workloads.

In some examples, in addition to the performance monitoring data, the input data for the trained machine learning model may also comprise one or more of: a workload identifier identifying at least one workload to be executed on the processing system; and a workload type indication indicative of a workload type of said at least one workload. For example the workload type may indicate a class of workload, with different classes allocated for representing workloads with certain kinds of performance or resource utilisation requirements—e.g. the workload could be classified as a compute-bound or memory-bound, or based on the length of the instruction dependency chains or number of branch predictions as described above. By including more direct indications of the specific workloads or the workload types/classes of the workloads being predicted, this may help to improve machine learning model accuracy.

The processing system may support a number of alternative hardware resource configurations corresponding to different allocations of hardware resource to respective processor cores of the plurality of processor cores. For example, the alternative hardware resource configurations may support different amounts of inter-core borrowing of hardware resources between the processor cores. The inference made by the trained machine learning model may comprise a configuration suitability indicator indicating at least one of the alternative hardware resource configurations as a suitable hardware resource configuration for executing at least one workload.

This configuration suitability indication could be represented in a number of different ways. In one example the configuration suitable indication may indicate the one of the alternative hardware resource configurations which is regarded as most suitable for executing the at least one workload. For example, a configuration suitability indication could indicate a configuration identifier of a single resource configuration. Alternatively the inference made by the trained machine learning model may comprise an array of configuration parameters for controlling different aspects of hardware resource allocation (e.g. a first control parameter for controlling the amount of cache capacity allocated to a particular core, a second parameter for controlling the pipeline width, a third parameter for controlling the effective size of a branch prediction store, and so on). In this case the model may predict the set of configuration parameters expected to be best for executing the at least one workload. As mentioned above this could be done separately for different workloads and then a subsequent step could be performed to group workloads with complementary resource configurations, or alternatively the configuration indicated may be a configuration associated multiple processor cores, which indicates suitable resource configurations for executing a group of workloads across the multiple cores.

However, in some examples rather than predicting only a single suitable alternative resource configuration, the trained machine learning model may provide an inference is capable of indicating two or more alternative hardware resource configurations as each being suitable for executing at least one workload. For example, the model may be a multi-label classification model (or a set of multi-class or binary classifiers which together function as a multi-label classification model). For example, the inference output by the trained machine learning model could comprise an array of elements, each element corresponding to one of the hardware resource configurations and providing a suitability metric predicted for that hardware resource configuration which indicates whether that hardware resource is considered suitable or not. For example, the suitability metric could simply be a binary indication which indicates whether the hardware resource configuration is regarded as suitable or unsuitable (good or bad) for the at least one workload being predicted. Alternatively the suitability metric could have three or more different values which may indicate different levels of suitability, so that the software analysing the inference made by the machine learning model can select the one of the alternative hardware resource configurations which provides the best suitability. Providing a multi-level score indicating suitability may help to support resource configuration algorithms where there are other considerations to take into account when configuring resources, not just the suitability for a particular workload, to allow the software to select a hardware resource configuration which is regarded as suitable but which is not necessarily the best operation for a given workload (e.g. other criteria to be taken into account, such as power efficiency or the overhead of switching resource, may favour a hardware resource configuration other than the best configuration predicted by the model). Another option is that each element of the inference array output by the machine learning model could indicate a predicted performance measure such as the instructions processed per cycle for the respective configurations, so that a more direct indication of the performance predicted for a particular hardware resource configuration is possible.

Hence, it will be appreciated that the input and output data for the machine learning model can be formatted in a range of different ways.

If a multi-label classification model is used, then if the inference indicates at least two alternative hardware resource configurations as each being suitable for executing at least one workload, there may be a subsequent step of selecting between those configurations based on one or more selection criteria.

One approach may be to use a selection criterion which prioritises selection of one of said at least two alternative hardware resource configurations with lower expected power consumption in preference to another of said at least two alternative hardware resource configurations with higher expected power consumption.

Another approach may be to favour hardware resource configurations which may be expected to provide the strongest performance boost. If the output data of the machine learning model indicates a direct performance measure predicted for a given workload/configuration, then this can be used to influence the selection. Hence, another possible selection criterion may prioritise selection of one of the at least two alternative hardware resource configurations with higher expected performance in preference to another of the at least two alternative hardware resource configurations with lower expected performance.

Which of these selection criteria is used could depend on a current status of the system. For example, the first selection criterion based on prioritising lower expected power consumption could be used when battery charge remaining is lower than a certain threshold, but if battery charge is higher than the threshold then the second selection criterion based on prioritising increased performance could be used.

In implementations which do not provide a direct indication of performance (e.g. just providing a binary good/bad indication for each configuration), a different selection criterion may be useful. One approach can be to use a selection criterion which prioritises selection of a hardware resource configuration with a greater amount of inter-core borrowing of hardware resources in preference to a hardware resource configuration with a smaller amount of inter-core borrowing of hardware resources, when both those configurations are regarded as suitable. This approach may be useful as if two or more different hardware resource configurations are all suitable for a given workload then the configuration with the most inter-core borrowing may provide more opportunities for performance boosting compared to a configuration with less inter-core borrowing. Hence, the amount of inter-core borrowing can be a proxy for the expected performance in cases where multiple hardware resource configurations are all regarded as suitable. There may be a number of ways of evaluating the amount of inter-core borrowing. In some examples the hardware resource configurations may support inter-core borrowing of two or more different types of resource (e.g. pipeline width and cache), so a hardware resource configuration in which a greater number of types of hardware resource are subject to inter-core borrowing may be considered to have a greater amount of inter-core borrowing compared to a resource configuration where fewer types of resources are shared in this way. Alternatively, the amount of inter-core borrowing could be tracked depending on the extent to which a single type of resource is borrowed. For example, a hardware resource configuration in which two cache ways are borrowed by a first core from a second core may be considered to have a greater amount of inter-core borrowing than a configuration in which only one cache way is borrowed. It will be appreciated that the relative ranking between different hardware resource configurations may be chosen differently for different implementations depending on the particular resource configurations supported. Nevertheless, in general, there may be a predetermined ranking between the respective resource configurations to be used when multiple resource configurations are regarded as suitable.

In other examples, a selection criterion may be used which prioritises selection of one of the at least two alternative hardware resource configurations with a smaller amount of inter-core borrowing of hardware resources in preference to another of the at least two alternative hardware resource configurations with a greater amount of inter-core borrowing of hardware resources. This approach may be more conservative, prioritising avoidance of loss of performance by a core which gives up resource ahead of potential opportunities to gain performance at a core which uses the borrowed resource from the other core.

Another option could be to use a selection criterion to prioritise selection of one of the at least two alternative hardware resource configurations which requires less change in hardware resource configuration relative to a current hardware resource configuration in preference to another of the at least two alternative hardware resource configurations which requires more change in hardware resource configuration relative to the current hardware resource configuration. This recognises that there may be an overhead in switching configuration (e.g. writing back dirty data from a borrowed portion of cache to memory, or draining borrowed pipeline units so that they become idle before being borrowed), so if multiple configurations are suitable, the configuration which requires the least change from the current configuration could be selected.

It will be appreciated that other selection criteria could also be used. Also, two or more of the selection criteria described above could be used in combination.

In some examples, another factor considered in selecting which configuration is used may be a time duration for which a given workload is expected to be executed. For example, for a short-lived workload which executes for a short time, it may not be beneficial to make a large change to the current configuration, while for a long-lived workload expected to be executed for a longer time, configuring borrowing of resource may be more beneficial. Hence, in some cases, the expected time duration for a given workload could be an additional input to the machine learning model, or could be used as part of the selection criteria for deciding how to prioritise between different suitable hardware resource configurations predicted as being suitable by the machine learning model.

There are many options possible for supporting different alternative hardware resource configurations in the processing system. The system may support any one or more of the following:

- A base configuration in which there is no inter-core borrowing of resource between processor cores. In this configuration a first processor core may use hardware resource provided within the first processor core but may not use any borrowed resource from other cores and a second processor core may use resource of the second processor core without using any borrowed resource from the first processor core. In some examples the input data for the machine learning model may be based on performance monitoring data gathered when processing in the base configuration, which may provide a baseline for determining whether other configurations can provide a performance improvement. Alternatively, more complex models may provide training data which may predict changes in performance expected for switches between any two configurations and may not be restricted to referencing the base configuration. However, if the base configuration is used as a reference for obtaining the performance monitoring data used for the input data for the training/inference phases of using the model, this may reduce the complexity of the model and may be sufficient to provide a performance boost.
- A reduced utilisation configuration in which, as in the base configuration, there is no inter-core borrowing of resource between processor cores, but where at least one processor core does not utilise its full processor resource, with a subset of resource of that processor core being disabled or placed in a power saving state to save energy.
- A configuration in which the first and second processor cores are completely fused to execute a single workload. In this case, all resource of the second processor core may be considered borrowed by the first processor core, for example, so that the cores operate together to execute a single program workload (i.e. a single stream of program instructions). This may provide extremely power-hungry applications with a large amount of additional resource to execute faster, at the expense of not being able to execute another workload on the second processor core in parallel with the first.
- A configuration in which the borrowed hardware resource comprises partial resource of the second processor core, so that the first processor core may be configured to execute a first workload using hardware resource of the first processor core and the borrowed hardware resource of the second processor core, in parallel with the second processor core executing a second workload using other hardware resource of the second processor core. This configuration can be useful for executing workloads with differing performance requirements so that a performance-intensive workload can execute faster because it may make use of hardware resource from another core which is executing another workload which does not fully utilise the available hardware resource.
- A configuration involving two-way borrowing where the first processor core processes a first workload using the borrowed hardware resource of the second processor core in parallel with the second processor core processing a second workload using borrowed hardware resource of the first processor core (e.g. the borrowed hardware resource of the first processor core used by the second processor core may be of a different resource type compared to the borrowed hardware resource which the first processor core borrows from the second processor core). For example the first core could borrow pipeline instruction slots from the second core to support execution of a compute bound workload while the second core could borrow cache capacity from the first processor core to support execution of a memory bound workload. By supporting two-way borrowing in the same configuration this can further boost performance when executing workloads with complementary performance requirements.

The hardware resource configuration supported by the system may restrict what types of resource can be borrowed in a certain direction between first and second processor cores. For example, one of the first and second processor cores could be allowed to borrow a greater amount of resource than the other, or the types of resource which can be borrowed by the first core from the second core could differ from the types of resource allowed to be borrowed by the second core from the first core. This may provide some efficiencies in that by restricting the available options for resource borrowing, less hardware logic may be needed to control the signalling between processor cores used for configuring the borrowing of resource and exchanging information when making use of that borrowed resource. For example, a pair of cores could support borrowing of pipeline resources in one direction and cache/memory resources in another direction, but not the opposite configuration. As scheduling decisions for scheduling workloads on the core may reflect what resource types are available for borrowing between certain types of cores, it may not be worth incurring hardware costs for symmetric support for inter-core borrowing between the first and second processor cores.

The control information set based on the inference made by the machine learning model may comprise configuration parameters for controlling allocation of at least two different types of hardware resource of the processing system. For example the borrowed hardware resource may comprise any one or more of: instruction queue storage capacity; fetch, decode or issue slots for fetching, decoding or issuing an instruction; at least one execution unit for executing processing operations in response to instructions; MAC (multiply-accumulate) units; shader cores; register storage; reorder buffer capacity in a reorder buffer for tracking commitment of instructions executed out-of-order in an out-of-order processing pipeline; cache storage capacity; tightly coupled memory (TCM); buffers; translation lookaside buffer storage capacity; and branch prediction state storage capacity. As there may be many different types of hardware resource which could be borrowed, predicting the best resource configuration for a given workload may be a multi-dimensional problem, with many different configuration parameters available for varying to define the particular hardware resource configuration to be used. This means the machine learning approach is particularly useful for learning the appropriate settings for the multi-dimensional borrowing control parameters for executing a given workload. It will be appreciated that not all of the types of hardware resource described above need to have borrowing supported in any given implementation. A particular implementation may choose any one, two or more of these types of resource which could be borrowed, or may provide other types of processing resource which could be borrowed between cores.

The techniques discussed above can be used for a single-core or multi-core processing system implemented on a two-dimensional integrated circuit (2DIC), where one or more processor cores are implemented on the same layer of substrate in the integrated circuit.

However, the techniques can be particularly useful for a multi-core processing system implemented using a three-dimensional integrated circuit (3DIC), where the respective processor cores are on different layers (tiers) of the 3DIC. With a 2DIC, support for inter-core borrowing may be limited by the latency associated with routing signals across the integrated circuit in two dimensions between corresponding parts of the respective processor cores. If each processor core is disposed on the integrated circuit as a distinct block of circuit components separate from the blocks corresponding to other processor cores, then to route signals from a given hardware resource type in one processor core to the corresponding hardware resource type in another processor core to allow one of the cores to benefit from the corresponding resource in the other core, this would require signals to be exchanged over wiring which has a length commensurate with the overall size of the processor core, which may incur a long delay and so may make it difficult to design the integrated circuit while meeting the circuit timings required to meet other performance criteria. Another approach could be that the integrated circuit could be laid out to group together blocks of circuit logic representing the corresponding hardware resource units of different processor cores, to reduce the signal path length in linking the corresponding resource units of the respective cores. However, this may impact on performance for regular program execution when there is no inter-core borrowing, as this may increase the latency of signals passing between respective pipelines stages or resource elements of an individual core. Also, this approach may increase the circuit development costs as verification operations performed for an existing core design may have to be redone to account for the re-partitioning of the respective components of the multiple cores.

In contrast, with a 3DIC these problems can be addressed because each layer of the 3DIC stacked on top of each other may effectively correspond to an already verified design of a single core as would be included on a 2DIC. Inter-layer vias may be used to link together the portions of respective cores which correspond to the same hardware resource type, which can be disposed above one another on the respective layers and so may have a much shorter communication latency than would be the case when communicating between respective cores implemented a core-width apart on a 2DIC. Therefore, 3DIC technology which places processor designs across two or more layers with respective processor cores on the different layers opens up much more opportunity to dynamically borrow extra resource from another core when necessary to boost performance, compared to what would be practical in a 2DIC. However, with the increased capability to borrow a greater amount of resource of a greater number of different types, this makes the decisions on which components of respective cores to fuse together much more complicated, and so this is why the machine learning approach discussed above can be particularly useful for controlling hardware resource configurations involving inter-core borrowing of hardware resource within a 3DIC.

The techniques discussed above could be applied to a system with only two processor cores. Alternatively the processing system could have three or more processor cores. If there are three or more processor cores, then it is not essential to support inter-core borrowing between every different pair of processor cores within the system. In some cases, the alternative hardware resource configuration supported by the multi-core system may restrict borrowing of resource between respective pairs of processor cores to limit which groups (e.g. pairs) of processor cores are allowed to borrow hardware resource from each other when the multi-core processing system is operating in a state in which the three or more processor cores are configured to execute at least two distinct workloads. Although the configurations may support complete fusion of all of the cores together to form a single fused core executing a single workload, if only partial fusion is being performed so that there are still two or more workloads running across the multiple cores, then it may not be possible to arbitrarily fuse any two selected cores of the system, but rather fusion may be supported only for certain pairs. For example, in a 4-core system it might be possible to fuse cores 1 and 2 with inter-core borrowing of resource between them, or to fuse cores 3 and 4 with inter-core borrowing between them, but it may not be possible to fuse core 1 with core 4 or fuse core 2 with core 4, for example, unless all four cores are being used to form a single core operating on a single workload. By restricting the pairs or groups of cores which are allowed to borrow hardware resource from each other, this can make the hardware implementation more efficient by limiting the number of inter-core connections needed to route signals from the borrowed hardware resource in one core to the portions of another core which make use of the information from that borrowed hardware resource, and also may simplify the gathering of the performance monitoring data (e.g. requiring fewer evaluations of event count differences in implementations using such difference values).

In some implementations, the setting of the control information based on the inference made by the machine learning model may be performed in hardware. Hence a processing system may comprise one or more processor cores, performance monitoring circuitry to obtain the performance monitoring data, and configuration control circuitry to set, based on an inference made by a trained machine learning model from input data depending on the performance monitoring data, control information for controlling an amount of hardware resource allocated to each processor core. In some cases the trained machine learning model may be implemented in hardware using bespoke circuitry designed to perform the processing using hardware circuit logic based on the model parameters previously learnt during a training process. For example a field programmable gate array (FPGA) or other application specific circuit could be provided to perform the machine learning prediction in hardware to generate the inference from the supplied input data. This may improve performance.

However, in many implementations the hardware cost of implementing such circuitry may not be considered justified, as for example the actual execution of the machine learning processing for predicting the inference may not be needed as often as the workloads are to be executed (it is possible to execute the machine learning model in an initial prediction phase, and then store the inferences generated by the model for future reference, or store the resource configuration information determined based on the inferences, so that on future occasions the previous predictions or configuration information can be read out without needing to repeat the machine learning processing).

Therefore, in some implementations the method described above may be implemented using software executing on a processing system. For example the software may be part of an operating system or other scheduling algorithm for controlling scheduling of workloads on the processing system and setting of hardware resource configuration. Hence, a non-transitory storage medium may store a computer program for controlling the processing system to perform the method described above. The software may read performance monitoring data from memory or from performance monitoring circuitry provided in hardware in the system (and may optionally perform further processing of the performance monitoring data to generate the model input data), provide the input data to the trained machine learning model, process the trained machine learning model to obtain the inference, and based on the inference set the control information. The control information could be information stored to memory to control future configuration of resources for the workload, or could be signals which are issued along hardware wiring paths to control the hardware system to configure the various resource types. The method using the trained machine learning model may be executed periodically, to save energy.

The trained machine learning model may be obtained by performing a computer-implemented training method for training the model to control the hardware resource configuration for the processing system. A training operation is performed for each workload or each group of workloads selected from two or more workloads or groups of workloads. The training operation comprises obtaining performance monitoring data indicative of processing performance for the selected workload or group of workloads when processed in a number of different hardware resource configurations of at least one processor core, where the different hardware resource configurations include configurations where different amounts of hardware resource are made available for use when processing the selected workload or the selected groups of workloads. Based on the obtained performance monitoring data, the machine learning model is trained to adapt its model parameters, and once the training operation has been performed for each of the two or more different workloads or groups of workloads, the trained model parameters resulting from those training operation instances are recorded. These recorded model parameters can then be used as the model parameters to be used in an inference phase once the machine learning model is being used to actually prediction suitable configurations for other workloads based on performance monitoring data gathered for those workloads.

The machine learning training can be performed in different ways. In some cases the machine learning may use an unsupervised learning approach where the performance monitoring data for the selected workload or group of workloads in the different hardware resource configurations is input to the model as training data, but where there is no supervised labelling of which hardware resource configurations may be considered suitable or not. A clustering machine learning model could be trained to learn categories/clusters of workloads based on their performance characteristics. When the trained model is subsequently used in the inference phase, it can predict, for a new workload to be predicted, whether the new workload fits with any of the clusters of workloads previously identified. The predicted cluster could then be used to assign a suitable hardware resource configuration to the new workload (e.g. based on a hardware resource configuration previously found to be suitable for a corresponding cluster of workloads by empirical analysis).

However, in one approach the machine learning model may be trained using a supervised learning approach where the performance monitoring data for the selected workload or a group of workloads in the different hardware resource configurations is processed to obtain input data for training and target data for training. For example the model input data could comprise performance monitoring data associated with the selected workload or a selected group of workloads when in a particular base configuration (such as the configuration where there is no inter-core borrowing), and the model training target data could be derived from the performance monitoring data associated with running the selected workload or group of workloads in other configurations. For example, the performance monitoring data for the other configurations could be used to generate labels indicating whether a performance criterion was satisfied when executing the selected workload or group of workloads. With this approach, it is not essential that the performance monitoring data set obtained for each of the different hardware resource configurations includes the same amount of data for a particular selected workload or workload group. For example, a detailed set of performance monitoring data involving many different performance counters could be used for the base configuration, to derive the input data for the model which characterises the type of workload(s), but the performance monitoring data received for other hardware resource configurations may be more limited and could indicate a relatively coarse performance metric such as instructions processed per cycle which can then be used to derive a label indicating whether performance was good or bad for a certain combination of workload/workload-group and configuration of hardware resource. The training algorithm of the machine learning model may adapt the model parameters to reduce an error cost function characterising a difference between the training target data and model output data predicted by the model based on the training input data, and by iterating for different sets of training input/target data this can adapt the model to improve prediction accuracy.

The training method for training the machine learning model may be performed offline, separate from execution of any program workloads on the processing system. For example the training method may be performed by a system/device developer, and then the trained machine learning model resulting from the training method could be supplied to software providers to build into their operating system or other system firmware when it is installed on the processing system.

The performance monitoring data used to generate the training input data or training target data for the training process could be gathered using performance monitoring circuitry implemented in hardware on a real processing system executing the workloads for which the performance monitoring data is gathered. Alternatively, the performance monitoring data used for training could be gathered by simulating execution of the workloads in different hardware resource configurations on a processor simulator, which provides an accurate simulation of a processor executing software, when considering the specific hardware resources provided in that processor design. The simulation approach could be useful where development of the software which is to incorporate the trained machine learning model is being performed in parallel with design of the hardware system itself, so that the software development is to be performed before any actual hardware implementation of the system is available.

FIG. 1 illustrates an example of a multi-core processing system 2 comprising two or more processor cores 4. While two processor cores are shown in the example of FIG. 1 there could be optional further processor cores provided. Each processor core has various processing resources for processing instructions. For example, each core 4 may have one or more local caches 6. A shared cache 8 may be accessible to multiple processor cores 4 and each of the processor cores has access to shared memory 10.

Figure 2:
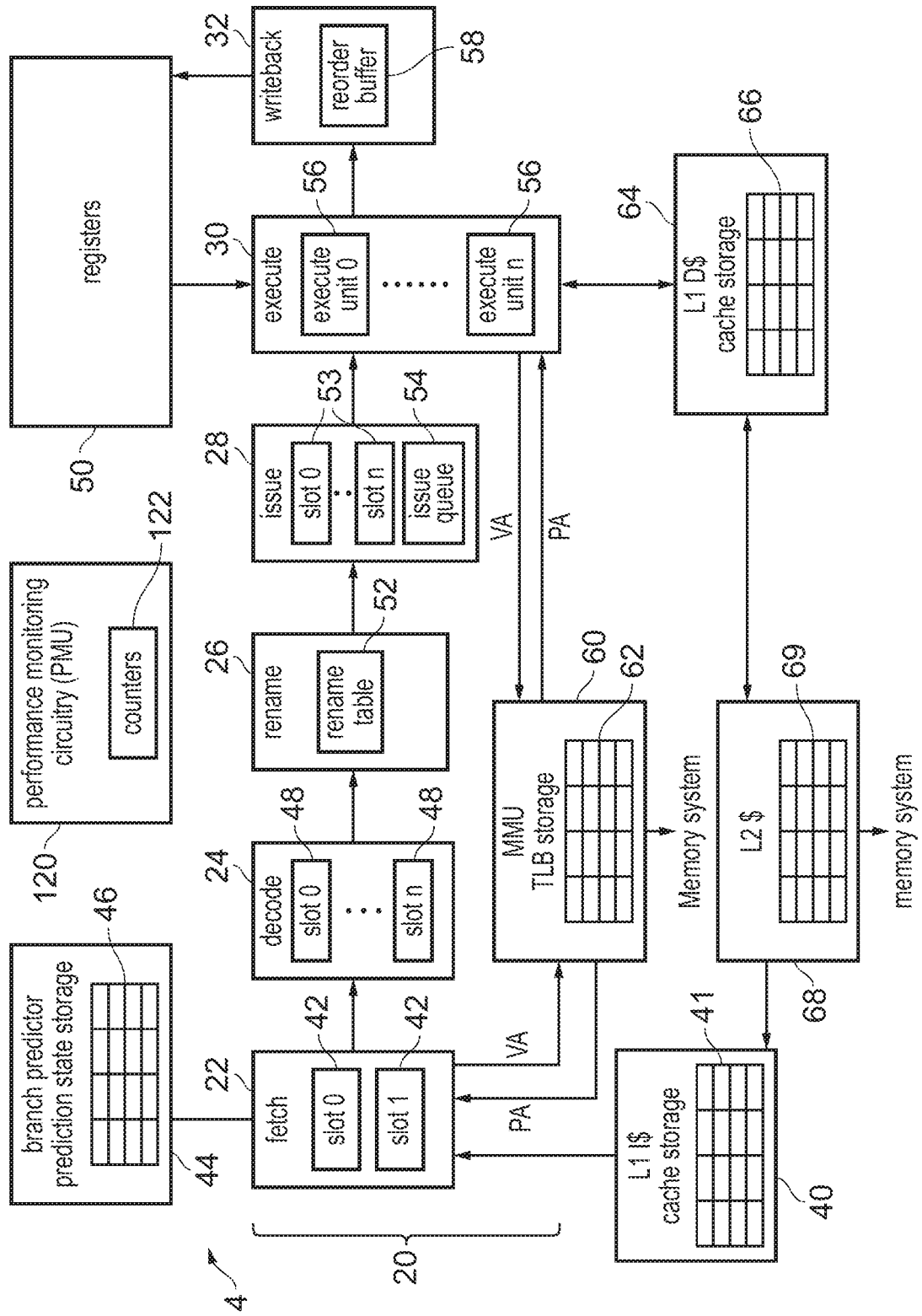
FIG. 2 shows an example of one of the processor cores of the multi-core processing system.

FIG. 2 shows an example of one of the processor cores 4 of the multi-core system. It will be appreciated that different processor cores 4 could have the same hardware configuration or could have different hardware configurations so it is not essential for each of the processor cores to be identical. That is, the processor cores 4 could be homogenous or heterogenous cores. However, FIG. 2 shows an example of one possible configuration for a processor core 4. In this example, the processor core 4 is a CPU (central processing unit), but other examples of processor cores may include a GPU (graphics processing unit), NPU (neural processing unit), DSP (digital signal processor), or other types of processing element. Hence, the term "processor core" is intended to encompass any such examples.

The core 4 includes a processing pipeline 20 for processing program instructions fetched from a memory system. The memory system includes caches 6, 8 and main memory 10. The pipeline includes a fetch stage 22, a decode stage 24, a rename stage 26, an issue stage 28, an execute stage 30 and a write back stage 32 in this particular example. Instructions pass from pipeline stage to pipeline stage and are processed in a pipelined manner, so that while one pipeline stage is processing one instruction, another pipeline stage may be performing a different phase of processing on a different instruction.

The fetch stage 22 fetches instructions from a level 1 instruction cache 40, or if there is a miss in the level 1 instruction cache 40, from a level 2 cache 68, shared cache 8 or main memory 10. The fetch stage 22 may have one or more fetch slots 42, where each fetch slot may perform fetch processing for a respective instruction. If there are two or more fetch slots 42, then multiple instructions can be fetched from different cache lines within the same cycle. The fetch stage may control fetching of instructions based on branch predictions made by a branch predictor 44 based on prediction state stored in prediction state storage circuitry 46. The branch predictor may predict the outcomes of branch instructions within program code being executed to control the fetch stage 22 to determine whether the next instruction to be fetched is the sequential instruction following on from the branch sequentially in program order (if the branch is predicted not taken) or an instruction at a branch target address of a branch (if the branch is predicted taken). The branch predictor 44 could also predict the branch target address of the branch.

The fetched instructions pass to a decode stage 24 which has one or more decode slots 48 for decoding instructions to identify the processing operations to be performed in response to the instructions. Based on the decoding, the decode stage 24 generates control information which controls subsequent stages to perform the corresponding operations represented by the instructions. Again, the decode stage 24 may include two or more decode slots so that it is possible to decode multiple instructions in the same cycle, in some examples.

The rename stage 26 performs register renaming to map architectural register specifiers specified by the decoded instructions to physical register specifiers identifying physical registers provided in hardware within a register file 50. Register renaming can be particularly useful for an out of order processing pipeline which enables program instructions to be executed in a different order to their program order, since by remapping architectural registers to different physical registers it is possible to eliminate some register dependencies between instructions so as to increase the opportunity for improving performance by reordering program instruction execution. A rename table 52 may be used by the rename stage to track which architectural register specifiers have been mapped to particular physical registers and to track which physical registers are available for allocation to new architectural registers.

An issue stage 28 includes an issue queue 54 for queuing instructions awaiting execution. The issue stage may check whether operands required for instructions will be available in time for execution at the execute stage, and controls instructions to be issued once it is determined that the operands will be available in time. For example the issue stage 28 may track dependencies between instructions and issue dependent instructions once it is known that the instructions they depend on have already been issued. In an out-of-order processor the issue stage may be allowed to issue a younger instruction in program order for execution before an older instruction in program order has issued, if the younger instruction is independent of the older instruction and the older instruction is stalled waiting for operands. The issue stage 28 may have a number of issue slots 53, each issue slot 53 for controlling issuing of a corresponding instruction. If there are two or more issue slots 53, then multiple instructions can be issued in parallel within the same cycle.

The execute stage 30 included a number of execution units 56 for performing the data processing operations required to be executed in response to the instruction processed by the pipeline 20. The execution units 56 could for example include arithmetic/logic units (ALUs) for performing arithmetic or logical operations on integer operands, floating point units for performing data processing on operands represented in floating-point format, vector execution units for performing vector processing operations involving vector operands comprising multiple independent data elements within the same register, or load/store units for controlling access to memory in response to load/store instructions. In some cases multiple execution units 56 of the same type can be provided within the execute stage 30 to allow multiple instructions corresponding to that type of execution unit to execute in parallel. For example, there could be two or more ALUs provided for integer instruction processing within the same execute unit 30 of a given processor core 4. The execute stage 30 may read operands from the registers 50, process the operands using one or more of the execute units 56 and generate one or more result values, which can be written back to the registers 50 by a write back stage 32. In an out of order processor the write back stage 32 may have a reorder buffer 58 for tracking commitment of instructions executed out of order. The write back stage may track which instructions have completed execution and which are still awaiting execution and their relative order in program order using storage entries in the reorder buffer 58. The size of the reorder buffer 58 may therefore limit how far ahead of the oldest pending instruction the issue stage 28 may issue younger instructions for execution ahead of the older instruction.

When load/store operations are executed, a memory management unit (MMU) 60 may handle address translation between a virtual address (VA) specified by operands of an instruction and a physical address (PA) identifying memory locations to be accessed in the memory system. The MMU may have a translation lookaside buffer (TLB) 62 for storing cached address translation information obtained based on page tables in the memory system. The TLB 62 can help to speed up address translation by reducing the frequency with which slow page table walk operations are required. The MMU and TLB 63 may also be used to perform address translations at the fetch stage 22 for translating fetch addresses of instructions to be fetched. While FIG. 2 shows a single MMU shared between the fetch stage for instruction address translation and the execute stage 30 for data address translation, in some implementations the MMU may be split into separate units for the instruction side and data side respectively, but the TLBs in the separate MMU units may cache address translation data from a common set of page tables in memory.

In this example, the memory system includes, as local caches specific to an individual core 4, the level 1 instruction cache 40 having cache storage 41, a level 1 data cache 64 having cache storage 66, and a shared level 2 cache 68 having cache storage 69 which is shared between instruction and data caching and is accessible on a cache miss in either the level 1 instruction cache 40 or the level 1 data cache 64. If data access requests or instruction fetches miss in the level 2 cache 68 then a linefill request may be sent out to a shared cache 8 shared with other cores 4, or to the main memory 10, to obtain the data or instructions required. It will be appreciated that the particular cache hierarchy shown in the examples of FIGS. 1 and 2 is just one example, and other examples could provide a different number of cache levels or a different relationship between instruction and data caching or could vary the number of caches or cache levels that are provided local to an individual processor core compared to the number of caches or cache levels that are shared between the cores.

FIG. 2 just shows one possible example of a pipeline architecture. It will be appreciated that other examples could have a different configuration. For example, if the processor core implements an in-order pipeline which is restricted to executing instructions in program order, then the rename stage 26 could be omitted and the registers 50 may include fewer registers as each architectural register corresponds to a distinct physical register. Also the reorder buffer 58 could be omitted from the write back stage for an in order pipeline.

As shown in the example of FIG. 2, a processor core may be provided with a number of different hardware resources of various types which help to support improved processing performance for instruction execution. For example these hardware resources may include the instruction processing slots 42, 48, 53 included for processing instructions at certain stages 22, 24, 28 of the pipeline, branch prediction state storage 46 within the branch predictor 44, physical registers within the register bank 50, instruction queue storage capacity within an instruction queue (such as the issue queue 54, or other queues for queuing instructions or operations awaiting processing, such as a load/store queue for queuing load or store requests to memory), execute units 56 within the execute stage 30, reorder buffer capacity 58 within the write back stage 32, TLB storage capacity 62 within the MMU 60 and cache storage capacity 41, 66, 69 within any of the caches 40, 64, 68. It will be appreciated that this is not an exhaustive list, and these are just some examples of resource types. There may be others.

In general, a processor provided with a greater amount of any of these resource types may have a greater likelihood of achieving improved processing performance for a given workload compared to a processor core with less resource. For example with additional instruction processing slots 42, 48, 53, a greater number of instructions can be processed at a given pipeline stage at once improving instruction throughput. Also, cores with greater cache capacity or TLB capacity may be less likely to encounter cache or TLB misses to reduce the average latency in processing memory operations. Similarly, processor cores with a larger reorder buffer 58 may be able to support a greater window of out of order processing to increase the opportunities for younger independent instructions to proceed when older instructions are stalled, increasing instruction throughput. Similarly, with a greater amount of branch prediction state storage 46 it may be more likely that branch prediction accuracy is higher to reduce the performance cost of handling mispredictions.

However, in practice, not all software workloads may fully utilise all the available resource. If each of the processor core 4 is provided with an amount of hardware resource which is expected to be able to handle the worst case performance requirements of performance-hungry workloads then much of the time the resource may be unutilised and this may waste the circuit area and power expended in providing that resource.

Hence, some multi-core systems may support inter-core borrowing of hardware resource, where one processor core is able to temporarily borrow some of the hardware resource from another core that is not needed for the workload executed on that core. For example, some of the pipeline instruction slots 42, 48, 53, execution units 56 or registers 50, or storage capacity within instruction queues, the reorder buffer 58, branch prediction state storage 46 or TLBs 62 or caches 40, 64, 68 may be allocated for use by a different processor core compared to the processor core which actually owns that resource. It is possible to perform such inter-core resource borrowing within a 2D integrated circuit where multiple processor cores 4 are implemented side by side on the same circuit layer.

Figure 3:
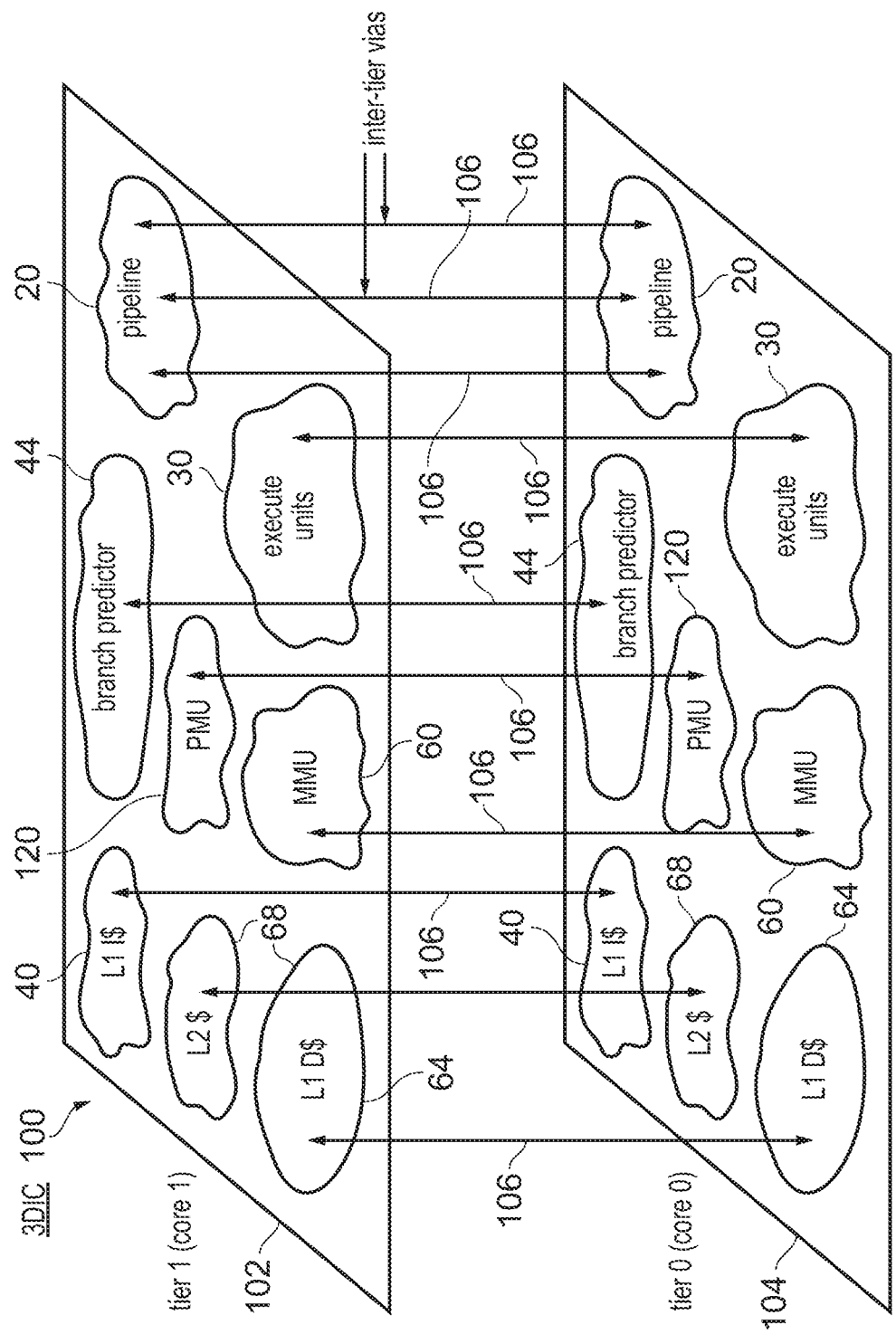
FIG. 3 shows an example of providing the processor cores on different layers of a three-dimensional integrated circuit.

However, as shown in FIG. 3, there may be more opportunities for inter-core borrowing in a 3D integrated circuit (3DIC) where the 3DIC is composed of a number of layers (also known as tiers), with each layer comprising active devices such as transistors and gates, where a first processor core may be implemented on a first tier of the 3DIC and a second processor core may be implemented on a further tier. The further tier may be stacked on top of the first tier (e.g. with the respective tiers fabricated separately and then stacked). Alternatively, in a monolithic 3DIC, the first and further tiers may be formed on a single substrate, with multiple active layers manufactured sequentially on top of the same substrate.

FIG. 3 shows an example of a 3DIC 100 with two tiers 104, supporting two processor cores. With this approach, corresponding elements of the respective cores may be arranged to be disposed above one another in the integrated circuit layout so that, for example, the level 1 instruction cache 40 of the core on layer 102 is directly above the level 1 instruction cache 40 of the core on the underlying layer 104, and similarly for other resource types in the system these are located at corresponding positions as indicated in the example of FIG. 3. It will be appreciated that the relative layout of the different components shown in FIG. 3 within one layer is merely a schematic and is not intended to represent any specific layout of the processor. As the corresponding components of the respective cores are directly above or below one another this means that communication between the corresponding parts of different cores can be made via inter-tier vias 106 which extend in the third dimension perpendicular to the plane of any individual layer. For example the inter-tier vias may be through silicon vias which extend through the substrate supporting the upper layer to reach the connected components in the lower layer. In FIG. 3, the length of the inter-tier vias is exaggerated in the drawing to enable a clearer illustration of the components on the lower tier 104, but in practice when multiple tiers of integrated circuit components are stacked, the length of the inter-tier vias may be much shorter than the length of 2-dimensional wiring which would be needed if corresponding components of multiple processor cores dispose side by side in a 2DIC were to be connected together. This means the latency of communicating between the corresponding components on the respective processor cores may be much shorter than would be possible in a 2DIC and so this makes it much more feasible to dynamically share resources between the cores and temporarily borrow resources of one core when processing a workload on the other core.

This approach can be referred to as 3D fusion. In 3D Fusion, wafer-bonding technology can be used to place CPU designs in two or more layers and add circuitry to pool microarchitectural resources between the CPUs that are stacked. This gives the CPUs the capability to dynamically borrow more resources when necessary, and, thus, temporarily boost performance, depending on the workloads running. This is similar to a heterogenous multi-processor design, but a difference is that, while heterogeneous multi-processor systems are configured statically at design time (a system is designed to have X big cores and Y little cores, where each big and little core is a fixed design), 3D Fusion enables dynamic heterogeneity. A 3D Fusion system can seamlessly be reconfigured (i) from 2N homogeneous cores (ii) to N fully-fused larger cores, or (iii) to 2N partially-fused cores, where parts of the resources from one CPU are lent to another CPU in another layer. Some examples of components that can be shared are, but not limited to, caches, functional units, physical registers, re-order buffers (ROB), branch prediction components, TLBs, and pipeline widths. Multiplexers can be added to the inputs and outputs of each component with enable signals activated based on the fusion mode selected, to select which portions of each component are used by a particular core. In a world with ever-increasing heterogeneity in workloads, such dynamic capabilities are very attractive. In some early performance studies, we find that 3D Fusion could provide an average boost of 17% and 25% speedup for 2×-fused and 4×-fused systems, respectively.

A key aspect to making use of dynamic heterogeneity is making the correct decisions on when to fuse and which components to fuse. While the components can be directly exposed to the OS or the user to freely adjust resource configuration parameters as desired, it can be difficult to decide on the correct parameters for a given workload, so it can be more desirable to have the system monitor the workloads and their performance at runtime, and automatically tune the design to improve overall system performance at the time. We employ an offline machine-learning-based approach, where we train the behaviour of single workloads or diverse workload pairs (for a two-layer fusion scenario) and their performance on various partially-fused configurations. In the specific examples described further below, these configurations include partially fusing caches, window-sizes (physical registers and ROB), issue widths, and various permutations of fusing these components, but a similar approach can be applied to configurations involving other resource types.

As shown in FIG. 2 and FIG. 3, each core may have performance monitoring circuitry 120 comprising various performance counters 122 for gathering the performance monitoring data used as input to the machine learning model. Each performance counter 122 may be configurable to count instances of a particular type of performance event, such as a TLB miss, cache miss, branch mispredictions, etc. The performance monitoring units 120 within the respective cores 4 may be disposed at corresponding locations above/below each other on the respective tiers of the 3DIC 100, to reduce latency when exchanging performance monitoring information between cores.

Figure 4:
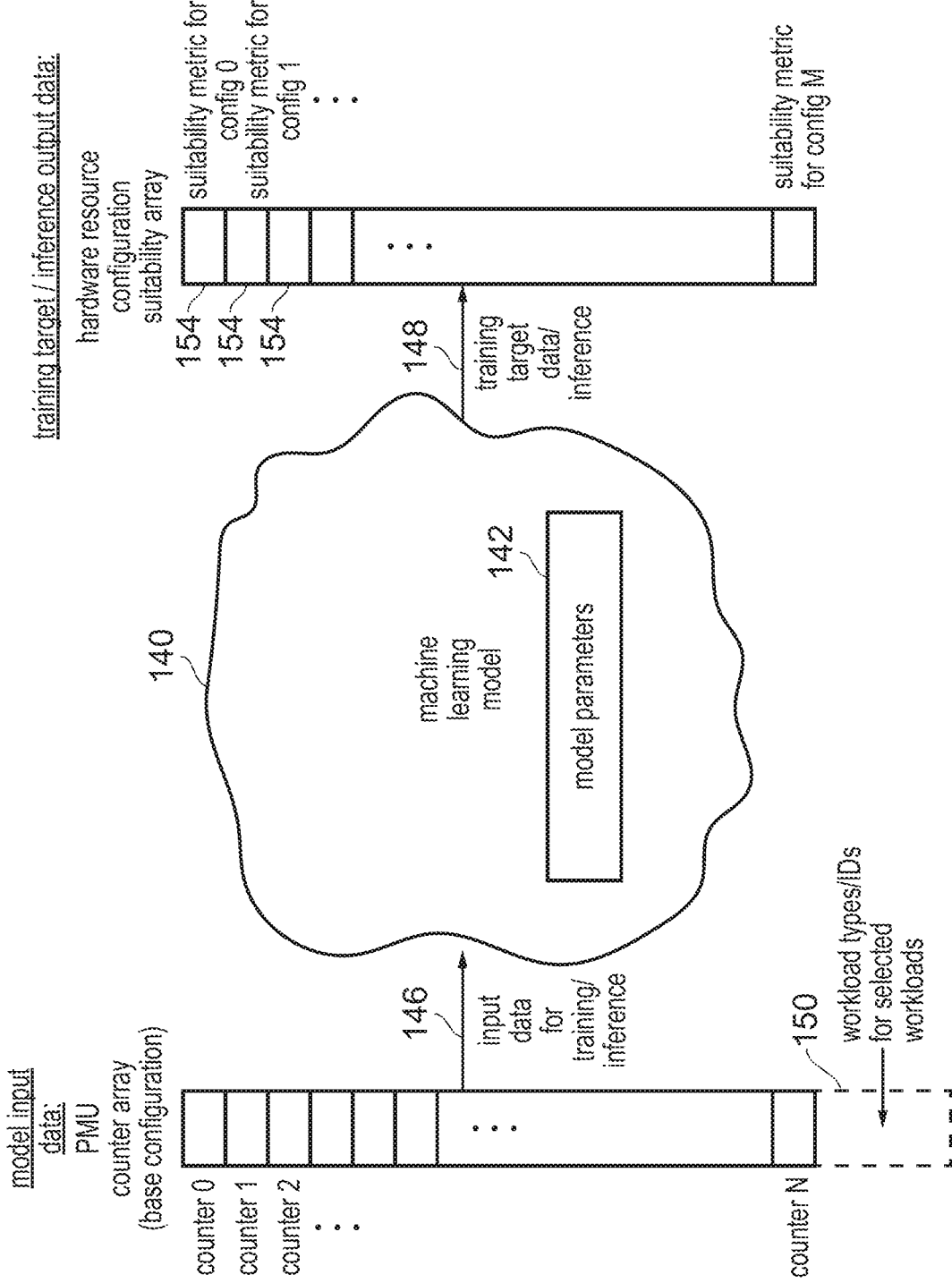
FIG. 4 shows an example of use of a machine learning model for making an inference based on performance monitoring data, where the inference may be used to control inter-core borrowing of hardware resource between processor cores.

FIG. 4 shows an example of using a machine learning model 140 to control setting of control information for configuring a multi-core system 2 to select an amount of inter-core borrowing of resource which is used when processing particular workloads. The multi-core system may support a range of different hardware resource configurations which vary in terms of the types of resource (and the amount of resource of a given type) which is borrowed from another core or lent to another core. As an example, when considering only three different resource types (cache capacity, out of order execution window (reorder buffer size) and pipeline width (e.g. number of execution units/instruction slots available for processing instructions)), then different combinations of resource settings could be provided as follows in one example (the labels 1.25× or 0.75× refer to configurations with 125% or 75% of the corresponding type of resource present in the base configuration, and for configurations which do not explicitly mention a given type of resource, the same amount of that resource is provided as in the base configuration):

base configuration (i.e. 1×_cache, 1×_window, 1×_width)
1.25×_cache
0.75×_cache
1.25×_window
0.75×_window
1.25×_width
0.75×_width
1.25×_window_1.25×_width
0.75×_window_0.75×_width 1.25×_cache_1.25×_window_1.25×_width
0.75×_cache_0.75×_window_0.75×_width
0.75×_cache_1.25×_window_1.25×_width.

These examples indicate possible configurations which were used for the performance analysis discussed later. However, it will be appreciated that many other configurations are also possible, including configurations with a wider range of borrowing than ±25%, and/or configurations involving complete fusion of some resource, e.g. where one core borrows all of the cache of another core as that other core is disabled.

Here the base configuration may be a configuration where there is no inter-core borrowing at all and so a first core operates with its own resources only and the second core only uses the resources of the second core. The other configurations involve some inter-core borrowing. The labels for the configuration shown above may be from the point of view of a first core but may implicitly also identify the amount of resource available to a second core in a two-core processing system. For example when the first core has 1.25× its normal cache capacity then this means that an extra 25% capacity has been borrowed from another core and so that core may only be using 75% of its available cache capacity. As can be seen from the examples listed above, different combinations of resource settings may be supported including configurations which only borrow one type of resource and configurations which include borrowing of multiple types of resources. As shown in the final example configuration, it is possible for some configurations to include a mixture of more and less resources of different types available to a given processor core, for example in the final example the core has only 75% cache capacity available because it has given 25% of its cache resource to another core but has an extra 25% out of order window and pipeline width available because it has borrowed reorder buffer or instruction queue capacity form another core and borrowed pipeline slots or execute units. Such a mix of more and less resources can be particularly useful as it may enable workloads with complementary performance requirements to operate more efficiently as discussed earlier. It will be appreciated that the list shown above is just one example and only considers a limited number of resource types to make the subsequent discussion more concise, but in processor cores with a large number of different resource types as shown in FIG. 2 then there may be a great number of configurations available.

The machine learning model 140 may be a classifier which may have two phases of operation: a training phase when the model parameters 142 are adapted based on training examples, and an inference phase where the trained model defined by the model parameters learnt in the training phase is used to predict inferences from new input data. The model parameters 142 may define how the input data 146 is transformed to generate the output data 148, e.g. defining how various elements of input data 146 are combined and processed to generate the corresponding output. The model may include a number of layers of processing defined by different subsets of model parameters 142. Many different model types may be applicable for the particular application of predicting suitable hardware resource configurations for executing a given workload. As discussed further below investigations have been carried out on various machine learning classification algorithms, including AdaBoost, Multi-Layer Perceptron (MLP), Random Forest, Gaussian Naïve-Bayes and Decision Tree, as discussed further below. In the investigations, supervised learning was used to train the models, but other examples could use unsupervised learning to train a clustering model for example.

FIG. 4 shows an example of a model which is trainable using supervised learning. As shown in FIG. 4, the input data 146 for the machine learning model can be an array of performance monitoring data gathered for a particular workload or group of workloads to be predicted. For example, the model input data 146 could include a number of performance counter values gathered using the performance counters 122 of the multi-core system at runtime when previously executing the workloads or group of workloads. A wide variety of events could be counted by the performance counters (e.g. cache misses at various levels of cache, retirement of instructions or of specific types of instructions, branch mispredictions, events associated with load/store instructions, cycles when certain pipeline stages are stalled, and so on). Where a group of workloads is accounted for in the model input data then the performance counter values for the respective workloads could be represented as separate sets of count values in different subsets of array elements of the input data, or could be combined into a single set of count difference elements which track differences between corresponding performance counters observed for the different workloads. In some cases the performance monitoring data associated with the respective workloads may not be obtained by the performance monitoring circuitry 120 on the same multi-core system 2 which runs the machine learning model 140 at the inference stage, but could be gathered separately by a different processing system in hardware or could be obtained by simulation by a cycle-accurate simulator which simulates the behaviour of the multi-core system. The performance monitoring data used to form the model input data may be associated with performance observed for the workload or group of workloads to be predicted when executed in the base configuration with no inter-core borrowing of hardware resource. Optionally, in addition to any performance monitoring data, the input data could also include additional information 150 which identifies workload identifiers of the one or more workloads being predicted or workload types for selected workloads, such as a type indicator identifying the class of performance characteristics expected for the workload (e.g. defining whether the workload is a compute-bound workload or memory-bound workload, or whether the workload encounters greater than a threshold number of branch mispredictions, or whether the workload exhibits long dependency chains of instructions).

The output data 148 of the machine learning model may comprise an array of hardware resource configuration suitability metrics, each indicating a value which can be used to decide whether a particular hardware resource configuration supported by multi-core system 2 is suitable for executing the corresponding workload or group of workloads. Each element 154 of the output array 148 corresponds to a particular one of the hardware resource configurations. In some implementations the base configuration may always be deemed to be suitable and so may not need an explicit array element 154 to be allocated to it, so the array may provide indications for each of the other configurations involving some inter-core borrowing.

In one example the suitability metric 154 could be an indication of a direct performance measurement associated with the corresponding pair of hardware resource configuration and workload (or workload group), for example indicating the IPC (instructions processed per cycle) when the workload or workload group is processed in that hardware resource configuration, either indicated as an absolute value or as a relative value indicating the performance boost observed relative to the base configuration.

In some examples the suitability metric 154 for a given configuration/workload pair may indicate whether at least one performance criterion is satisfied for the corresponding configuration when executing the corresponding workload (or group of workloads). For example, each suitability metric 154 could be a binary label indicating whether the configuration is suitable or unsuitable for the corresponding workload or group of workloads. In the training phase of the machine learning model, target data 148 providing the array of suitability metrics 154 for a given workload or workload group may be provided by the user or based on automated analysis of performance monitoring data gathered for the workload or group of workloads when run in the various hardware resource configurations other than the base configuration.

In one example, the performance criterion for assessing whether a given configuration is good/bad for processing a given workload/workload group may be based on whether the performance improvement/drop relative to the base configuration is greater or less than a given threshold. For example the IPC measured for a given workload/configuration pair may be analysed, and for a hardware resource configuration which allocates more resources to the workload, the configuration can be labelled as suitable ("good") if the IPC improvement relative to the base configuration is greater than a certain threshold, and may be labelled as unsuitable ("bad") if the IPC improvement is less than the threshold. For configurations where the workload is allocated less resource than in the base configuration, the configuration may be marked as suitable if the degradation in IPC is within a certain threshold and may be marked as unsuitable if the IPC degradation relative to the base configuration is worse than the threshold. The thresholds used do not need to be the same for the configurations with more and less resources. Different thresholds could be used for these purposes. Also, in some cases different thresholds could be used for assessing configurations with different resource types. It will be appreciated that the criterion of whether IPC improvement/degradation relative to the base configuration is greater than or less than a threshold is just one example of a performance criterion which could be evaluated for each combination of workload(s) and configuration to determine whether the configuration is suitable. Other criteria could also be used.

Hence, when the machine learning model is operated in the training phase then the training target data 148 provides labels for supervised learning, and a cost optimisation function can be used to adapt the model parameters 142 to adjust the model parameters based on cost functions which represent the difference between predicted values generated from training input data based on the current values of the model parameters 142 and the training target data providing the labelled examples corresponding to the training input data. By repeating this optimisation function for multiple training examples corresponding to different workloads, the model parameters can be adjusted iteratively to improve the prediction accuracy.

On the other hand, in the inference phase when the model is actually being used to configure resource allocation in a multi-core system, the input data may have the same format as in the training phase, but may be based on performance monitoring data gathered for new workloads which were not necessarily within the training set for which the model was trained. The output of the model may then provide new suitability metrics 154 for the different hardware resource configurations supported by the system, which can then be analysed to determine which configurations may be suitable for the workload or workload group being predicted, or used to set control information for configuring the hardware resource allocation between cores 4.

In this example the machine learning model is a multi-label classification model because the output 148 may indicate more than one of the different configurations as a suitable configuration for the particular workload or workload group being predicted. That is, a multi-label classification model provides each sample with zero or more possible labels that are not mutually exclusive. This can be useful because sometimes suitability for the particular workload may not be the only criterion to use and there may also be other criteria to consider, such as power consumption, latency or overhead of switching configurations. Therefore it could be useful to identify multiple different configurations as all being suitable so that there is more flexibility for the control algorithm to take other factors into account as well. In other words, we aim to maximize the number of fused opportunities seized with partial fusion. For example, if fused configuration A outperformed configuration B, but B still provided positive speedup over not fusing at all, we would like to consider both configurations. In this way, using multi-label classification has a better potential to identify all possible opportunities than using multi-class classification.

However in other examples a single-label classifier could be used which only indicates a single preferred hardware resource configuration as being the best to use for the particular workload or workload group being predicted. In this case the output could take a different format, for example indicating a single configuration identifier which identifies the best configuration, or a set of resource control parameters which indicates a predicted set of resource control settings to be made for different types of resources.

Also, it is possible for multi-label classification problems can be transformed into binary classification or multi-class classification problems (a binary classifier is a classifier which classifies each instance into one, and only one, of two classes, and a multi-class classifier is a classifier which classifies each instance into one, and only one, of three or more classes). One method is to simply use the binary relevance method, which trains one binary classifier for each label independently, but this would not effectively catch the possible correlations between class labels. On the other hand, label power-set creates one binary classifier for every label combination, which is better at capturing the correlation but can lead to very high computational complexity as the possible combinations can grow exponentially with the number of labels considered. Classifier chains are another method to implement multi-label classification using binary classifiers. As the name suggests, classifier chains predict each label sequentially, while feeding the output of all previous classifiers as features to subsequent classifiers. Hence, in some cases the machine learning model could be a suite or series of binary or multi-class classifiers which together implement the same function as a multi-label classifier.

Figure 5:
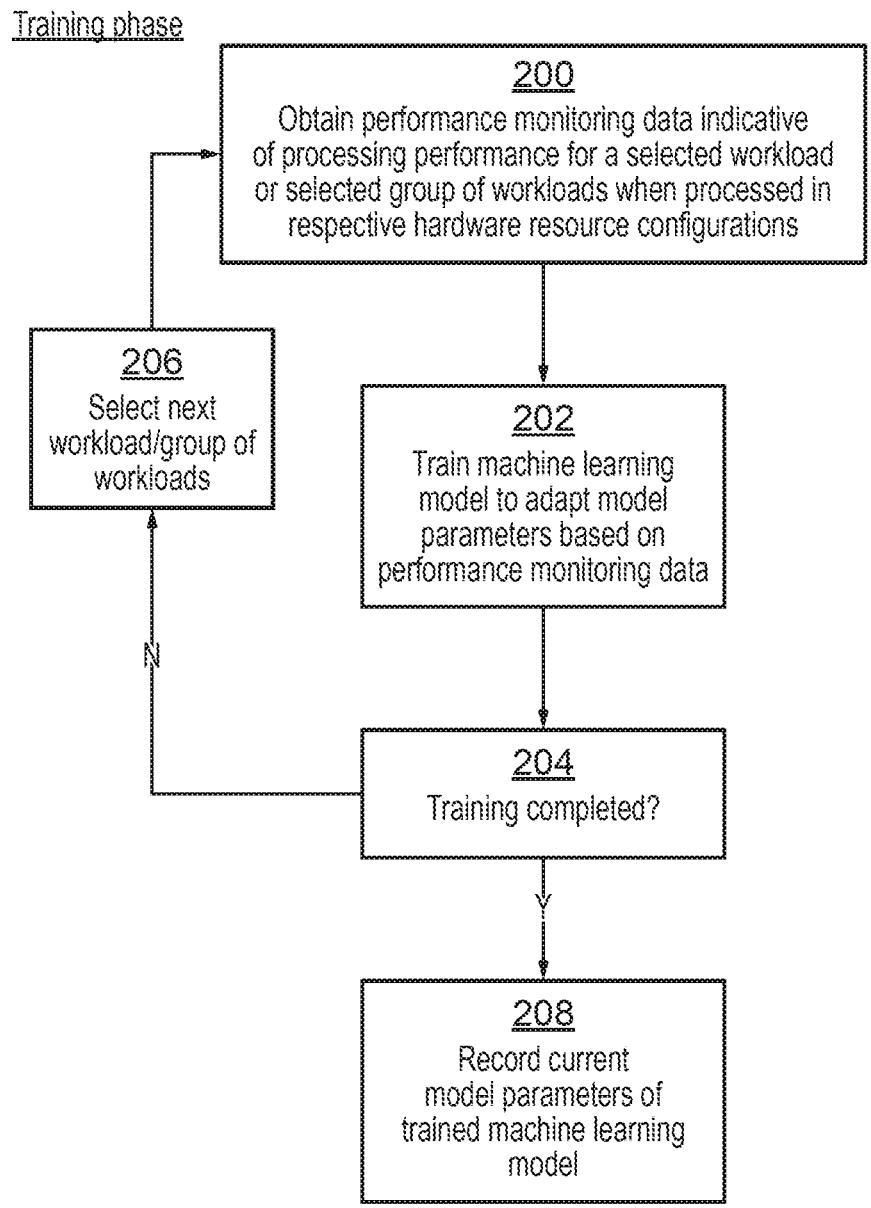
FIG. 5 is a flow diagram showing a method of training the machine learning model for controlling hardware resource configuration for the multi-core processing system.

FIG. 5 is a flow diagram showing a method of training the machine learning model 140 in a training phase. The training phase may be controlled by software executing on a processing system, which could be the multi-core system 2 itself, but often may be a separate computing system. The training phase may be performed offline, so does not need to be performed at the time of actually configuring hardware resource on the multi-core system. The machine learning model 140 implemented on the multi-core system may record the trained parameters learnt previously when the training phase was performed offline.

At step 200 the training system obtains performance monitoring data indicative of processing performance for a selected workload or selected group of workloads when processing respective hardware resource configurations of the multi-core system 2. This performance monitoring data could be obtained by execution of the workloads in the respective hardware resource configurations on a real system or could be obtained by simulating processing of the workloads using a simulator.

At step 202 the machine learning model 140 is trained to adapt its model parameters 142 based on the performance monitoring data obtained at step 200. The particular training function used may depend on the type of machine learning model used.

At step 204 it is determined whether training has been completed. Different criteria may be performed to determine whether training is completed. In some cases there may be a fixed number of training examples of workloads or groups of workloads to be processed in the training phase, and so training may be considered completed once each of the workloads or groups of workloads provided as training examples have been processed. Alternatively, the decision on whether training has completed may depend on the outcome of the previous training operation performed at step 202. For example, training may be halted if an error metric representing error between the predicted output data and the training target data for a given set of input data is less than a certain threshold, or if an adjustment metric characterising the amount of adjustment made to model parameters 142 in a previous iteration of the training operation is less than a certain amount (alternatively, some implementations may require that the error metric or adjustment metric is less than the threshold for a certain number of consecutive iterations, or in more than a certain fraction of a given number of iterations, before halting training). Hence, in some cases training may be halted early if it is determined that the model parameters are already suitably adapted for prediction. Another option may be that, rather than using the training data itself to characterise error, a separate test data set comprising test input data and test target data may be used to evaluate errors between predicated output data generated by the model based on the current model parameters and the test input data, and the test target data which has been indicated as being the correct output for the test input data. In this case, training may be complete when the error is below a certain level for the test data set.

If training is not yet complete then at step 206 the next workload or group of workloads provided as a training example is selected and then steps 200-204 are repeated to perform a training operation for the next selected workload or group of workloads. Once training is completed at step 204 then the method proceeds to step 208 where the current model parameters obtained by adaptation in the previous training operations are recorded to preserve those adapted model parameters which represent the trained machine learning model 140, representing the relation between the input performance data provided as a model input and the prediction of suitable hardware resource configurations for executing the corresponding workload. The recorded model parameters stored at step 208 may be made available for use by a machine learning model 140 executing on the multi-core system 2 when in the inference phase when the model is used for controlling resource configuration.

Figure 6:
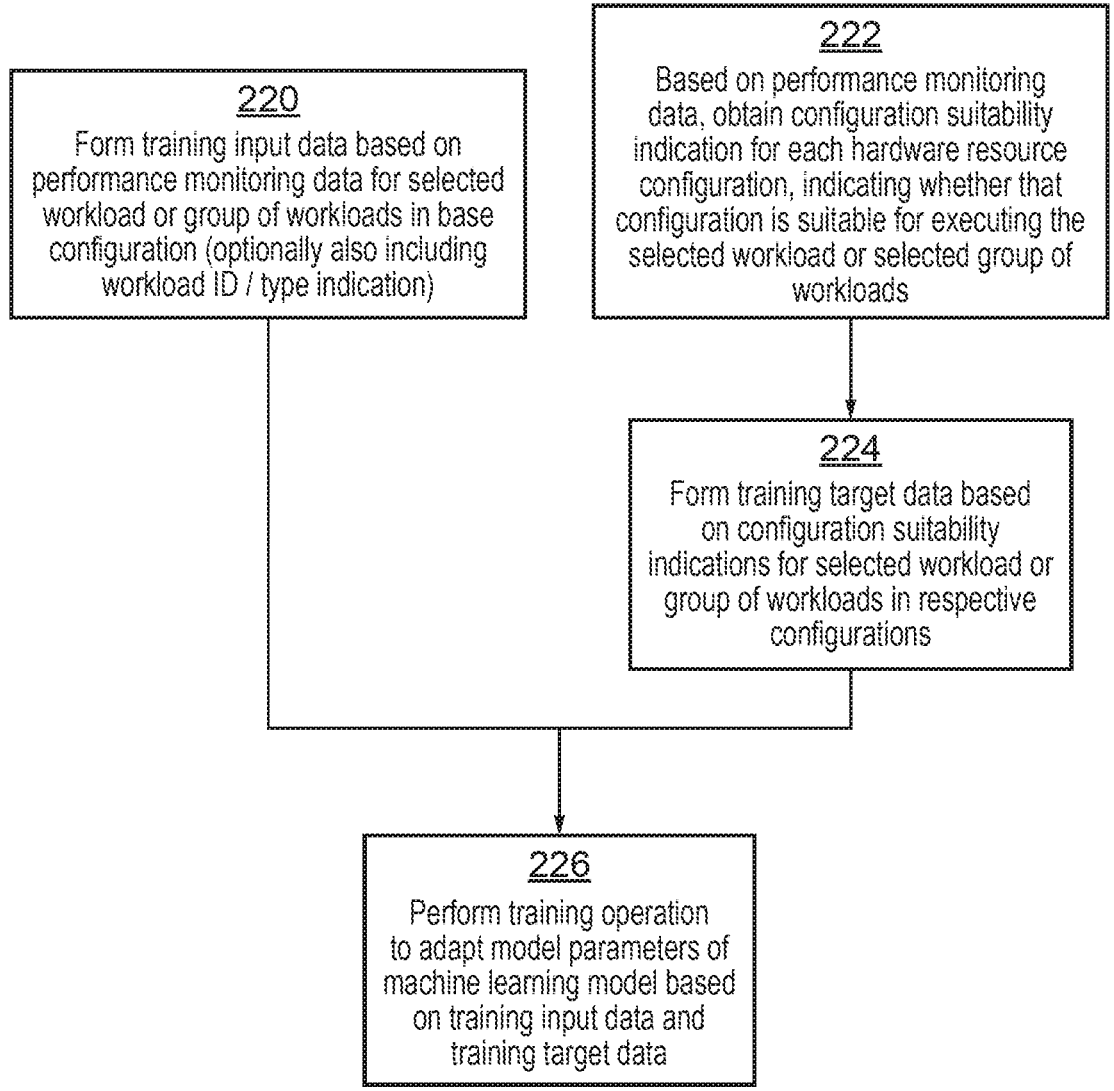
FIG. 6 shows in more detail training processing for adapting model parameters for the machine learning model based on performance monitoring data.

FIG. 6 shows an example of the training processing at step 202 of FIG. 5 in more detail, for an example where supervised learning is used as shown in the example of FIG. 4. At step 220 training input data 146 for the model is formed based on performance monitoring data for the selected workload or group of workloads in the base configuration. For example the performance monitoring data may include various performance counter values which may count events such as cache misses, branch mispredictions, etc. As discussed further below the training input data could comprise the absolute values of these counters or could comprise difference values indicating a difference between the corresponding counters obtained for the group of workloads.

Meanwhile, based on the performance monitoring data, at step 222 configuration suitability indications 154 are obtained for each hardware resource configuration/workload pair, indicating whether that configuration is suitable for executing the corresponding workload or selected group of workloads. For example the suitability indication could be an indication of the performance boost or drop seen relative to the base configuration in that particular hardware resource configuration or could be a good/bad indication as discussed above which indicates whether at least one performance criterion is satisfied for the selected workload or group of workloads when processed in the corresponding hardware resource configuration. At step 224 the training target data for training is formed based on the configuration suitability indications for the selected workload or group of workloads in the respective hardware resource configurations. While FIG. 6 shows step 220 performed in parallel to steps 222, 224, in other examples these could be performed sequentially.

At step 226 the training operation is performed to adapt the model parameters of the machine learning model 140 based on the training input data and the training target data. The particular cost optimisation function used for the training operation may depend on the type of machine learning model used. In general each type of machine learning model may have a training function which takes as inputs a set of training input data and a set of training target data and then adapts the model parameters 142 to reduce an error between the training target data and a predicted output generated based on processing the training input data using a current set of model parameters. Examples of specific model types are given further below.

Figure 7:
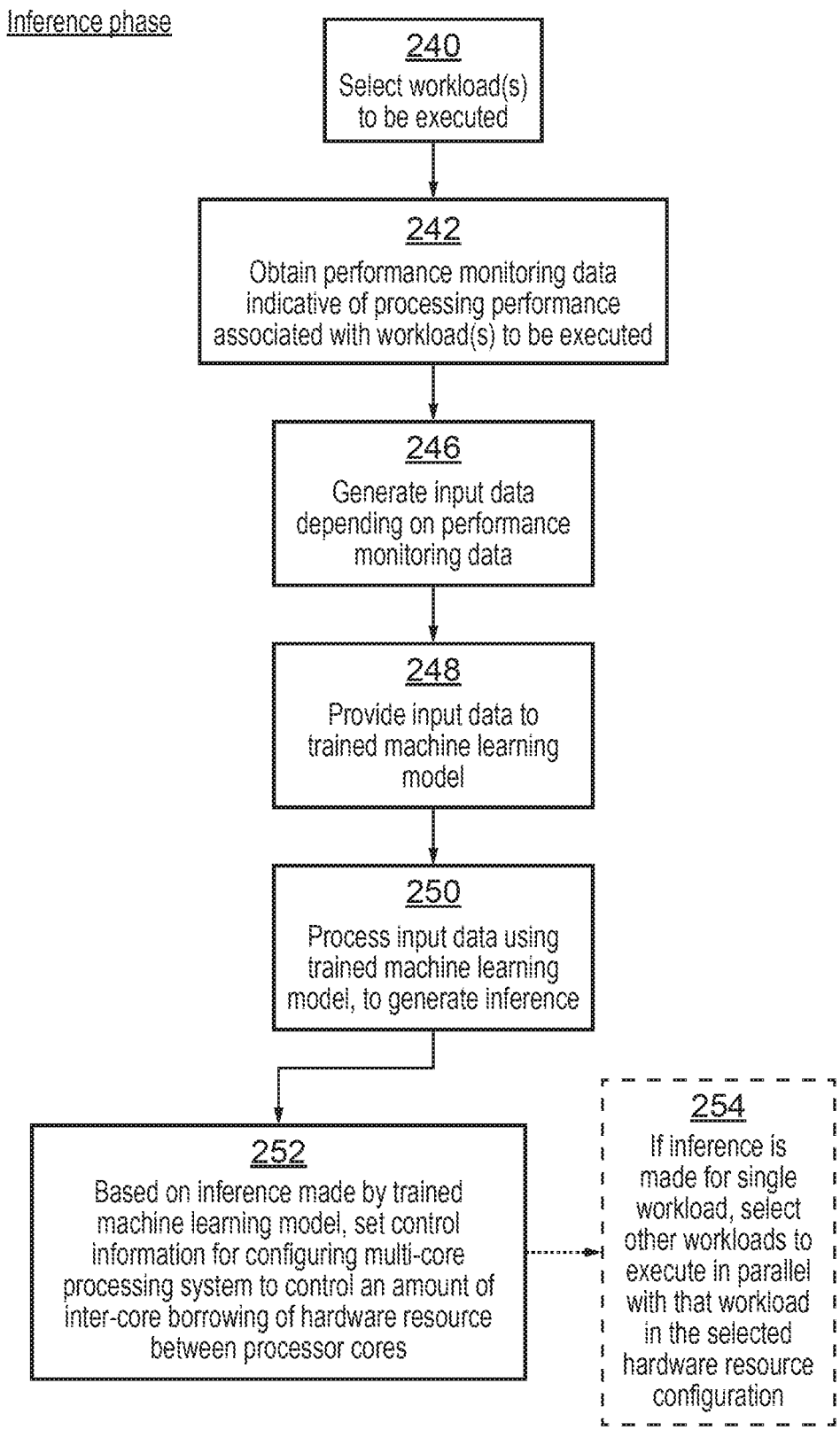
FIG. 7 shows a method for processing performance monitoring data using the trained machine learning model to generate an inference used to set control information for configuring the multi-core processing system to control an amount of inter-core borrowing of hardware resource.

FIG. 7 is a flow diagram illustrating a method of using the machine learning model in the inference phase, when a prediction of a suitable hardware resource configuration is being made for a workload to be executed on the multi-core system. For example the method of FIG. 7 may be performed in software by an operating system or other scheduling software for controlling which workloads are executing and for configuring the hardware resources of the processing system. Alternatively, the method could be performed by bespoke hardware for implementing the machine learning model which has been configured to map inputs to outputs according to the previously learnt model parameters 142 determined in the training phase.

At step 240 a workload or group of workloads is selected to be executed on the multi-core system. A single workload may be selected if the machine learning model 140 has been trained based on input data for only a single workload, while a group of two or more workloads could be selected if the machine learning model has been trained based on sets of performance data for multiple workloads or on difference information representing differences in performance between multiple workloads.

At step 242 the performance monitoring data indicative of processing performance associated with the workload or group of workloads to be executed is obtained. This can be obtained from the performance monitoring units 120 of respective processor cores, by reading hardware registers providing the performance count values tracked for the workloads when they have previously been executed in the base configuration of the respective cores, or could be read from memory based on previously generated performance monitoring data. The performance monitoring data stored in memory could have been gathered from previous execution runs using the performance monitoring units 120 provided in hardware, or could have been stored in memory from an external source, such as another processing system or a simulator.

At step 246 input data is generated depending on the performance monitoring data. The input data is generated in a corresponding manner to the format used during the training phase. For example the input data may comprise an array of performance count values or performance counter difference values for the selected workload or group of workloads gathered corresponding to processing in the base configuration and could also optionally include the indications 150 of workload type or workload identifier for the selected workload or group of workloads. In some examples, the indications 150 could also include an indication of the time for which the workload or group of workloads is expected to be executed (to allow recognition that it may not be beneficial to borrow if the workload is only expected to execute for a short time).

At step 248 the input data is provided as the input to the machine learning model 140 and at step 250 the trained machine learning model 140 processes the input data by applying various functions defined by the model parameters 142, to process and combine respective elements of the input data to generate the inference data 148. At step 252, based on the inference made by the trained machine learning model, control information is set for configuring multi-core processing system 2 to control an amount of inter-core borrowing of hardware resource between processor cores. For example the control information could be signals which directly control the allocation of the different resource types between the processor cores, or could be some information stored to memory which can then later be read to control those resource control signals.

When hardware resource allocation is reconfigured based on the control information generated at step 252, some operations may be performed to drain the reallocated hardware resource of information associated with the workload previously using that resource, or to wait for that resource to become idle, before reallocating the resource to another core for use in processing a different workload. For example, when borrowing a portion of cache storage, dirty data in the cache may be written back to memory, or when borrowing a pipeline unit or portion of a queue, the borrowed element may be drained of instructions/requests or be required to become idle before the borrowing proceeds and the element is made available for use by another core.

If the machine learning model processed performance monitoring data relating to a group of multiple workloads then the control information set at step 252 may be sufficient for configuring the multi-core processing system to process that group of workloads, as this control information may account for the resource control settings at different processor cores.

However, if the machine learning model processes performance monitoring data for a single workload at a time, then having set control information to indicate preferred configuration settings for the selected workload, at step 254 an optional further step may be performed to select other workloads that can execute in parallel with the selected workload in the selected hardware resource configuration. For example step 254 may comprise one or more further passes through steps 240-252 for another workload or a number of candidate workloads, to identify suitable resource configurations for those other workloads. At step 254 a selection from the candidate workloads may be made to select a workload which can efficiently execute in parallel with the selected workload processed in the first pass through steps 240-252, for example selecting a workload which can execute using remaining resource of a second core which is not borrowed in the resource configuration selected for the first workload at step 252 on the first pass.

The example of FIG. 7 shows using the machine learning model to control inter-core borrowing of hardware resource. However, in other examples the control information set at step 252 may be used to control hardware resource utilisation, with the control information setting what fraction of a given core's hardware resource is utilised by that core, but without any inter-core borrowing of resource between cores. The machine learning technique can also be useful in that scenario to control what resource settings should be made within a single core (either an individual core within a multi-core system, or the processor core within a uni-core system which only comprises a single processor core 4).

Figure 8:
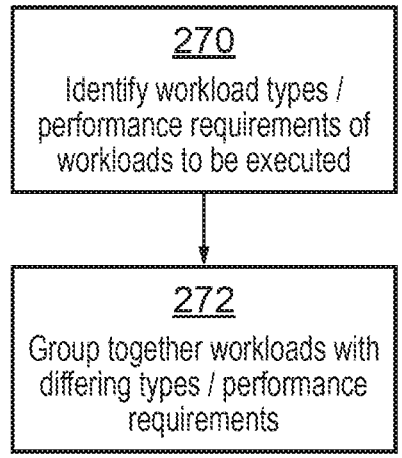
FIG. 8 illustrates a selection of a group of workloads to be executed on the multi-core processing system.

FIG. 8 shows in more detail the step of selecting a group of workloads to execute alongside each other, which could either be performed at step 240 before performing the machine learning model process or at step 254 after generating a machine learning prediction for a single workload. At step 270 workload types or performance requirements are identified for particular workloads to be executed. This can be based on analysis of the performance monitoring data recorded for those workloads in a particular resource configuration such as the base configuration. For example the IPC count for a workload in the base configuration or cache miss metric in the base configuration could be used to identify whether the workload is a compute-bound workload or a memory-bound workload. Also, performance statistics regarding branch mispredictions could be used to classify workloads. Also, an analysis of the program code of workloads or of performance monitoring data generated at runtime could be used to classify workloads in terms of their average dependency chain length. If the method of FIG. 8 is being performed at step 254 after some processing of performance data by the machine learning model, then the outputs of the machine learning model could be used to determine the workload type or the performance requirements. For example if the machine learning model predicted that a configuration where the workload is executed using less cache resource is suitable for that workload then the workload could be identified as being more likely to be a compute-bound workload while if the model predicts than a resource configuration with less pipeline resource may be more suitable then it may be more likely that the workload is a memory-bound workload.

At step 272 the workloads with differing types or performance requirements are grouped together to form a group of workloads which may be more likely to execute efficiently in parallel. For example a group comprising a compute-bound workload and a memory-bound workload may be formed as it may be that the memory-bound workload can benefit from the cache resource which is not needed for the compute-bound workload and the compute-bound workload can benefit from using pipeline slots or other pipeline resources that are not needed for the memory-bound workload. Similarly, workloads with more and less branch mispredictions could be grouped together so that it is more likely that the workload with more branch mispredictions may be allocated to a core with more branch prediction resource than the workload with less branch mispredictions.

Hence, by using performance data or the model predictions to identify workloads of differing performance requirements and grouping these together, more efficient usage of the resources available in hardware can be achieved and this makes it less likely that the design for the processor needs to be over resourced to handle multiple workloads of the same type in parallel.

Figure 9:
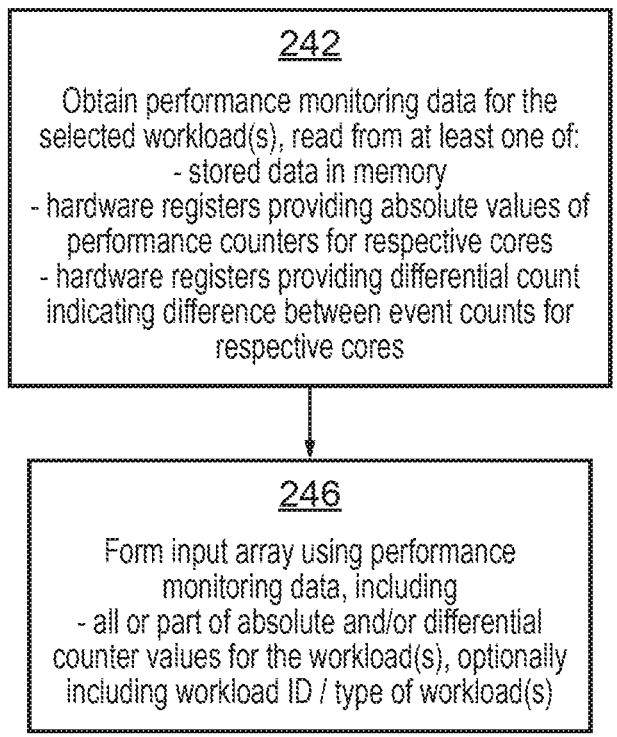
FIG. 9 shows a method of forming input data for the trained machine learning model.

FIG. 9 shows in more detail the steps 242, 246 for obtaining the performance monitoring data and generating the input data. FIG. 9 shows one particular example but it will be appreciated that steps 242 and 246 could also be performed in a different way. At step 242 the performance monitoring data is obtained for the selected workloads, which can be read from at least one of the following sources: stored data in memory; hardware registers providing absolute values of performance counters for respective processor cores; and hardware registers providing differential count values indicating a difference between event counts for respective cores.

At step 246 the input array 146 for the machine learning model is formed using the performance monitoring data obtained at step 242, which may include all or part of the absolute and/or differential counter values for the selected workload or group of workloads and they optionally also include the workload identifier or type of the selected workload or group of workloads.

For the two-thread paired case, we found that, instead of using raw performance counter values from each core separately, using the differences of the values of each core leads to much higher accuracy in the ML classifiers. This is because resource borrowing may depend less on the raw performance or statistics of individual cores, but more on the relative resource requirements between the paired workloads. For example, if workload A running on the CPU on the top layer of a 3DIC requires more cache resources than workload B running on the CPU on the bottom layer, relative cache statistics (difference in cache misses and accesses) can be considered and some of the caches that belong to the bottom layer could be re-allocated to the top layer, in hope to improving A's performance a lot while affecting B's performance not as much, overall improving the system throughput.

For some system-level components and resources that are shared between multiple cores, a per-core difference is not always possible, but these statistics may still be useful in learning the characteristics of the workload. Annotating system-level stats by associated core where possible, thus calculating per-core statistics, will improve the accuracy of the ML models. Furthermore, newer counters can be implemented that better indicate such characteristics, or better summarize the behaviour of larger components. These new summary counters could make reading out counters from the cores periodically more efficient and effective for the machine learning algorithms.

While one option to implement such a design would be to read out the various performance counters from each individual CPU and calculate the differences in software, we propose to implement more efficient dedicated circuits to calculate the differences in hardware. A naïve way to implement this is to add subtractors to every performance counter. However, many performance counters are quite long (up to 64-bits), leading to a high area and latency overhead.

Figure 10:
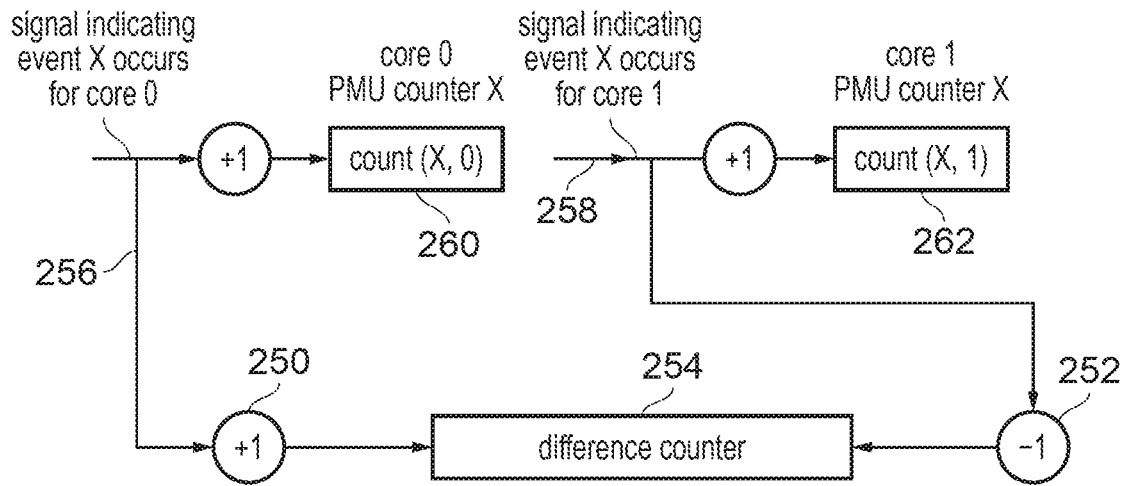
FIG. 10 shows an example where a differential counter register maintains an event count difference value maintained by hardware circuit logic of the multi-core processing system.

Therefore, as shown in FIG. 10, another option is to add incrementers 250 or decrementers 252, which increment or decrement difference counters 254 based on the event indicating signals 256, 258 indicating occurrence of performance events in the respective cores 4, so that one core can monitor activity in other cores and maintain its difference counter accordingly. Note that, in a 3DIC example, as the cores 4 in the respective layers may be exactly aligned in 3D, the corresponding counters 260, 262 providing the absolute event counts in each core may be directly on top of another in the 3D stack, so there is almost no additional routing overhead in routing one of the event occurrence signals 256, 258 to another core to maintain its difference counter 254. For example, as shown in FIG. 10, when a performance event of given type X occurs in core 0, then as well as incrementing core 0's absolute event counter 260, the signal 256 indicating occurrence of event type X on core 0 can cause an incrementer 250 to increment the differential counter 254 maintaining the difference between the number of events of type X occurring on cores 0 and 1. When event type X occurs on core 1, the signal 258 indicating occurrence of event type X at core 1 may, in addition to causing incrementing of core 1's absolute event counter 262, also cause decrementer 252 to decrement the differential counter 254. Therefore, the differential counter 254 is maintained in hardware and can be read directly by software to obtain the differential event count, without software needing to subtract two counters to obtain the difference. This can provide a significant performance saving when obtaining differential event counts for a large number of different performance event types. Although not shown in FIG. 10, the difference counters can also have special hardware circuit logic to "cancel" out events in case counters in both layers are incremented or decremented at the same time. Although the differential counter 254 can be useful for providing as input to the machine learning model, the original performance counters 260, 262 (providing the absolute count values) can still be provided for their original purposes. Also, in some examples, the model input data 146 may also include the absolute values, or part of the absolute values (e.g. a portion of most significant bits of the absolute count value of one of counters 260, 262), to allow the model to be trained not only based on count differences but also based on count magnitude.

Figure 11:
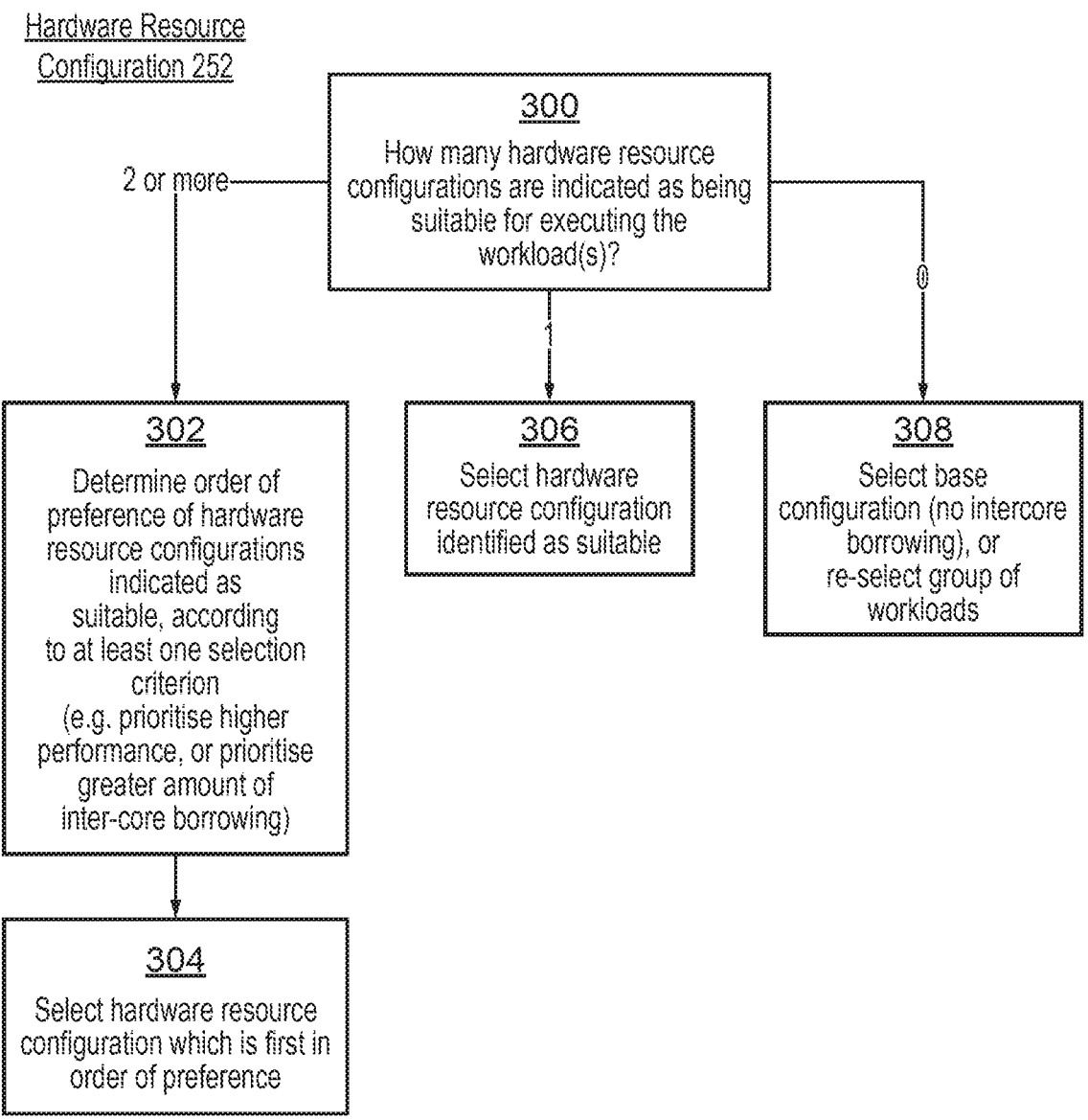
FIG. 11 shows a method of selecting a hardware resource configuration for the multi-core processing system based on the inference made by the machine learning model.

FIG. 11 shows in more detail processing which may be performed at step 252 of FIG. 7 for controlling the setting of the control information that defined a hardware resource configuration to be used for a selected workload or group of workloads. At step 300 it is determined how many hardware resource configurations are indicated as being suitable for executing the workload or the group of workloads. As the example in FIG. 4 is a multi-class classification model then it is possible that two or more different hardware resource configurations may be indicated as suitable. If so then at step 302 an order of preference of the hardware resource configurations indicated as suitable is determined according to at least one selection criterion. For example if the output metric 148 for the machine learning model provides direct indications of performance, such as an identification of the performance boost or drop relative to the base configuration, then a criterion could be applied which prioritises the one of the suitable hardware resource configurations that provides the higher performance boost or the lowest performance drop. Alternatively, if a simpler suitability metric is used which merely indicates a binary good/bad indication, or there are multiple hardware resource configurations of equal performance identified, then another selection criterion could be applied. For example a selection criterion could be used which prioritises configurations with a greater amount of inter-core borrowing ahead of configurations with less inter-core borrowing, as if there are a number of configurations with different amounts of inter-core borrowing which are all considered suitable then it may be expected that the workload to be executed on the core from which resources borrowed may be able to operate acceptably with lower resource and so by prioritising the configuration which provides the greatest amount of inter-core borrowing then this may provide the greatest opportunity for the more resource-hungry workload on the core that is borrowing additional resource to operate with greater instruction throughput. Other implementations could choose a different criterion—that configurations with less amount of inter-core borrowing are prioritised ahead of configurations with more inter-core borrowing. This approach may reduce the risk of an application losing performance due to being executed on a core giving up resource to another core. In some examples, the ranking of priority between the different supported configurations may be defined in advance using a preference rank matrix or other stored information stored in memory or hardwired in hardware. Also, in some cases the order of preference of the suitable hardware resource configurations could also depend on other factors such as power considerations. At step 304, based on the ranking and the order of preference, the hardware resource configuration that is first in the order preference is selected and the control information is set to identify that hardware resource configuration as being preferred for executing the workload or the group of workloads.

On the other hand, if at step 300 only a single hardware resource configuration was indicated as being suitable for executing the workload or group of workloads then at step 306 the control information is set to indicate that particular hardware resource configuration as the one to use for that workload or group of workloads.

For some model types the model may be arranged so that at least one workload is always regarded as suitable. However, other model types may, depending on the precise formatting used for the output array 148, sometimes indicate that none of the configurations are suitable for executing the workload or group of workloads. In this case then at step 308 by default the base configuration could be selected and the control information set accordingly, so that this workload or group of workloads would be executed using the default resource of a single core without any inter-core borrowing. Alternatively, when none of the resource configurations are deemed to be suitable then the step of selecting the group of workloads to be run together could be repeated to change the allocation of which workloads are to execute in parallel, so that the machine learning model can be used once more to see whether that other group may have a better chance of running efficiently together.

Figure 12:
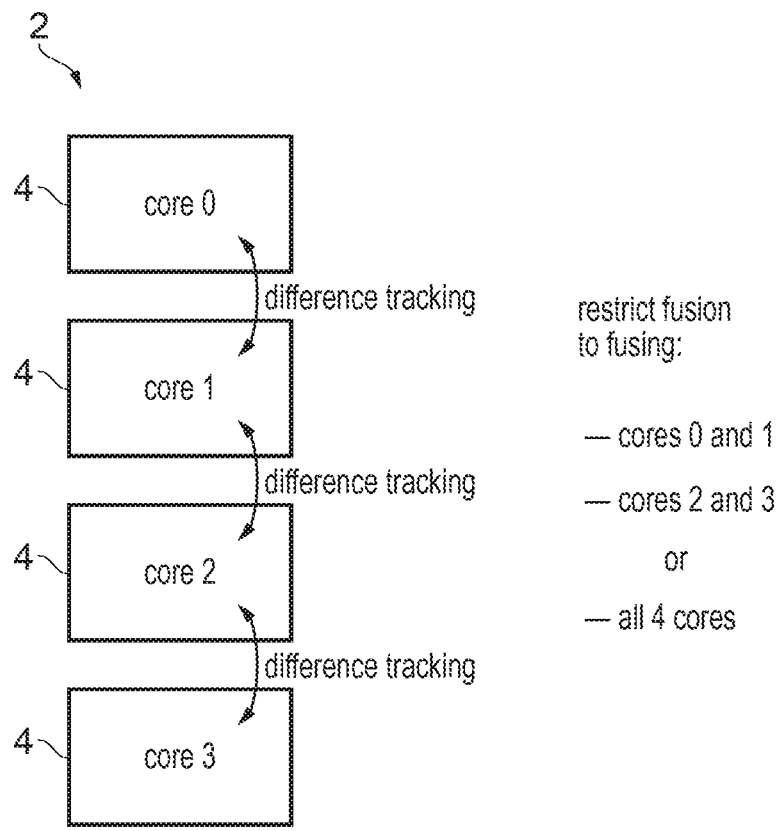
FIG. 12 illustrates restricting inter-core borrowing to certain pairs of processor cores in a multi-core processing system having three or more processor cores.

The examples above have discussed a two-core system having two processor cores 4, but as shown in FIG. 12 it is also possible to use machine learning techniques as discussed above in a multi-core processing system 2 having more than two processor cores for example four cores 4 as shown in FIG. 12. In this case it may be desirable to restrict the combinations of cores which support fusion to share resources between them. We can restrict the fusing options to alleviate the complexity. For example, for a 4-layer 3D system, we can only allow the fusing of (1) layers 1 and 2, (2) layers 3 and 4, or (3) layers 1, 2, 3, and 4. This simplifies implementation of the difference counters as discussed in FIG. 10, as it means that the differences only needs to be maintained (1) between layers 1 and 2, (2) between 3 and 4, and (3) assuming layers 1 and 2 and layers 3 and 4 are already fused, between these fused layers. A tree-like difference counter structure can be useful for such a system. Also, restricting the combinations of cores which can perform fusion may also help in reducing the overhead of implementing the inter-core connections needed for allowing one core to access resources in another core, so simplifies the hardware overhead. In practice it may not be necessary for any arbitrary pair of cores to share resources since if there is a pair of workloads which could benefit from that resource sharing then these could be scheduled on a pair of cores which does permit resource sharing, rather than scheduling the workloads on a pair of cores which does not permit resource sharing between them.

Figure 13:
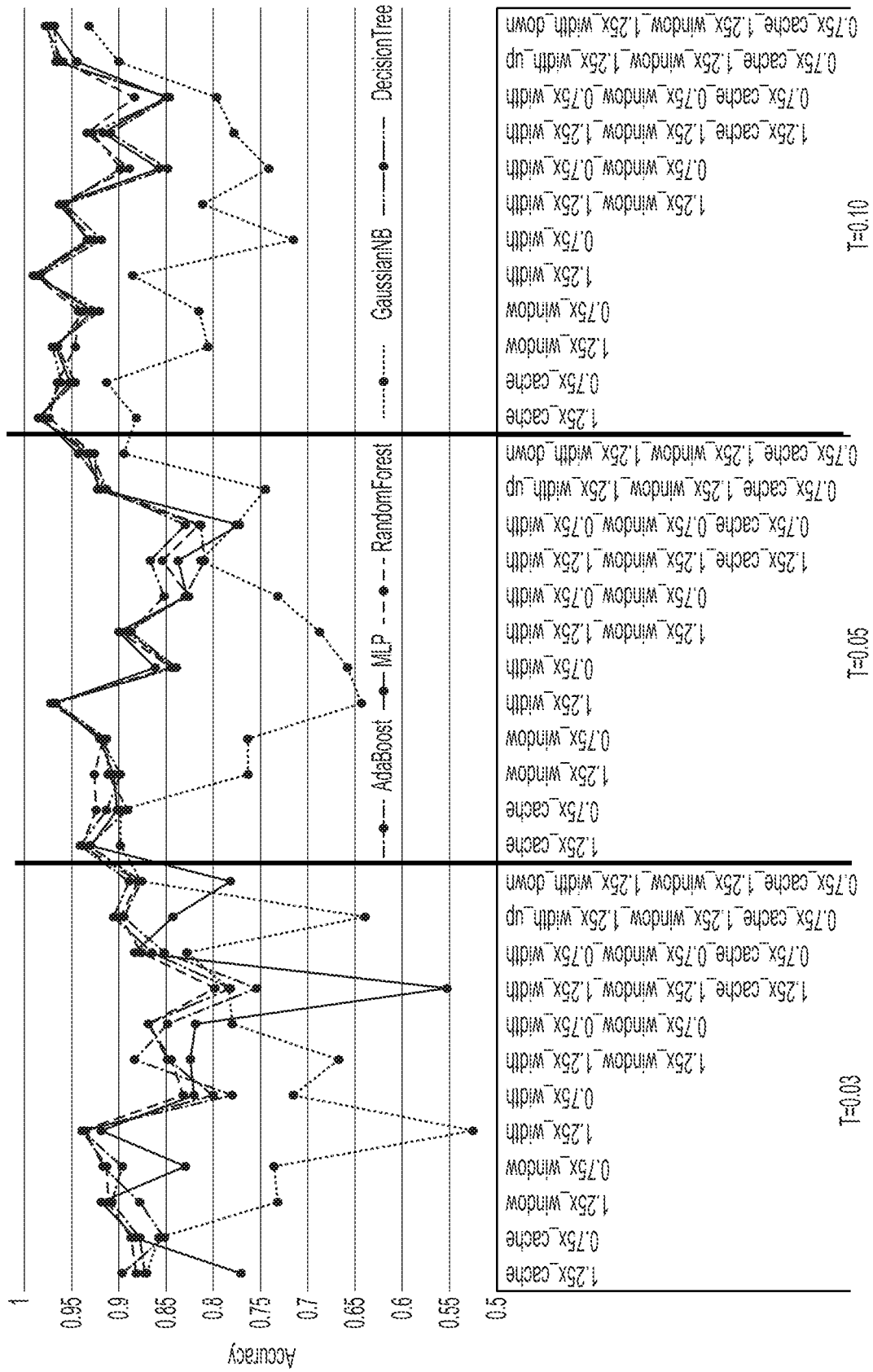
FIG. 13 is a graph illustrating prediction accuracy by various types of machine learning model when predicting whether various hardware resource configurations are suitable for processing corresponding workloads.

FIG. 13 is a graph showing results of investigations investigating the suitability of different types of machine learning model for the application of predicting suitable hardware resource configurations for executing particular workloads, based on the performance monitoring data associated with those workloads. In this investigation, all the machine learning models used were based on the open source models available from the scikit-learn platform at https://scikit-learn.org/stable/index.html. The model types used were as follows (with the variable parameters of each model type defined as shown below):

AdaBoost: {'algorithm': 'SAMME.R', 'base_estimator': None, 'learning_rate': 1.0, 'n_estimators': 10, 'random_state': None}-https://scikit-learn.org/stable/modules/generated/sklearn.ensemble.AdaBoostClassifier.html MLP (Multi-Layer Perceptron): {'activation': 'relu', 'alpha': 1.0, 'batch_size': 'auto', 'beta_1': 0.9, 'beta_2': 0.999, 'early_stopping': False, 'epsilon': 1e-08, 'hidden_layer_sizes': (100), 'learning_rate': 'constant', 'learning_rate_init': 0.001, 'max_iter': 200, 'momentum': 0.9, 'n_iter_no_change': 10, 'nesterovs_momentum': True, 'power_t': 0.5, 'random_state': None, 'shuffle': True, 'solver': 'adam', 'tol': 0.0001, 'validation_fraction': 0.1, 'verbose': False, 'warm_start': False}-https://scikit-learn.org/stable/modules/generated/sklearn.neural_network.MLPClassifier.html Random Forest: {'bootstrap': True, 'class_weight': None, 'criterion': 'gini', 'max_depth': None, 'max_features': 'auto', 'max_leaf_nodes': None, 'min_impurity_decrease': 0.0, 'min_impurity_split': None, 'min_samples_leaf': 1, 'min_samples_split': 2, 'min_weight_fraction_leaf': 0.0, 'n_estimators': 3, 'n_jobs': None, 'oob_score': False, 'random_state': None, 'verbose': 0, 'warm_start': False}-https://scikit-learn.org/stable/modules/generated/sklearn.ensemble.RandomForestClassifier.html# sklearn.ensemble.RandomForestClassifier Gaussian Naïve Bayes: {'priors': None, 'var_smoothing': 1e-09}-https://scikit-learn.org/stable/modules/generated/sklearn.naive_bayes.GaussianNB.html Decision Tree: {'class_weight': None, 'criterion': 'gini', 'max_depth': 3-5, 'max_features': None, 'max_leaf_nodes': None, 'min_impurity_decrease': 0.0, 'min_impurity_split': None, 'min_samples_leaf': 1, 'min_samples_split': 2, 'min_weight_fraction_leaf': 0.0, 'presort': False, 'random_state': None, 'splitter': 'best'}-https://scikit-learn.org/stable/modules/generated/sklearn.tree.DecisionTreeClassifier.html Gradient Boosting: {'criterion': 'friedman_mse', 'init': None, 'learning_rate': 0.1, 'loss': 'deviance', 'max_depth': 3, 'max_features': None, 'max_leaf_nodes': None, 'min_impurity_decrease': 0.0, 'min_impurity_split': None, 'min_samples_leaf': 1, 'min_samples_split': 2, 'min_weight_fraction_leaf': 0.0, 'n_estimators': 100, 'n_iter_no_change': None, 'presort': 'auto', 'random_state': None, 'subsample': 1.0, 'tol': 0.0001, 'validation_fraction': 0.1, 'verbose': 0, 'warm_start': False}-https://scikit-learn.org/stable/modules/generated/sklearn.ensemble.GradientBoostingClassifier.ht ml For generating the training input data and training target data for each model, a set of performance monitoring statistics was gathered by running a certain number of workloads in each of a range of hardware resource configurations and gathering a number of performance counter values for each pair of the workloads and configurations. In the particular analysis made, each execution run of a given workload on a given configuration generated 1606 distinct performance statistics, and this was run for each combination of 1802 different workloads executed in the base configuration and each of the 11 other configurations listed above when discussing FIG. 4 (the examples labelled 0.75×_cache_1.25×_window_1.25×_width_up and 0.75×_cache_1.25×_window_1.25×_width_down refer to two separate data sets obtained for the same configuration with 75% cache capacity, 125% window size and 125% pipeline width compared to the base configuration). The total size of the file recording all the performance monitoring data was 3 GB in this particular example. To reduce the volume of data to be processed by the machine learning model, a pruning procedure was performed to remove statistics that are either all 0 for the base configuration or which have very little variation between configurations. This was done by sorting the statistics by their standard deviation evaluated across the different configurations and simulation points (workloads), and removing the stats have the smallest variation as indicated by the standard deviation. The models were then trained based on the top 500 statistics as ordered by standard deviation. The results shown in FIG. 13 show processing when using 500 performance count entries per workload/configuration pair, but in practice subsequent analysis later found that a reasonable prediction accuracy is also possible with fewer statistics, such as using as few as 30 or 10 statistics types, so it is not essential to use as many as 500 statistics. Some clustering could also be provided to remove some statistics that are found to behave similarly to other statistics from the performance data, so as to focus on a smaller subset of statistics. This could help to reduce the complexity of the machine learning model and the size of the array of model parameters 142 which would be needed to process the input arrays as well as reducing the latency of running the machine learning model processing in both the training and inference phases.

Hence, for each of the model types the input array was formed based on the remaining performance count values obtained for a given pair of workloads when executed in the base configuration. It was found that accuracy was higher if the input array is formed based on the differences between the corresponding counter values in the sets of performance data gathered for the pair of workloads rather than including the absolute values, but other examples could also include at least part of the absolute values.

The training target data was an array of suitability metrics where, as discussed above each metric indicates for a particular configuration whether that configuration is good or bad, defined as follows:

For configurations with more resources:
  GOOD: if IPC improvement greater than <threshold>
  BAD: if IPC improvement less than <threshold>
For configurations with less resources:
  GOOD: if IPC degradation within <threshold>
  BAD: if IPC degradation worse than <threshold>.

The investigation repeated the training for different thresholds, sweeping thresholds of 3%, 5%, 10%, for example. The good/bad labels for each configuration are treated as the "ground truth" which is the training target in the learning performed in the training phase.

Based on this format of the input and output data for the model, training was performed using 70% of pairs of workloads randomly chosen from the available workloads, to generate the adapted model parameters for that particular model, and then testing was performed using the remaining 30% of pairs of workloads and it was determined whether the suitability metric predicted for a given configuration by the trained machine learning model matched the suitability metric which would be determined based on the IPC count according to the criterion discussed above based on the thresholding of the IPC improvement or degradation. The accuracy of each type of model in predicting the suitability metrics for each configuration type is shown in FIG. 13 for the three different thresholds. The left hand part of FIG. 13 shows the prediction accuracy when a threshold of 3% was used, the middle part shows the same analysis for a threshold of 5%, and the right hand part shows the same analysis for a threshold of 10%.

In general, it was found that random forest or decision tree models had the greatest accuracy. Also in general the accuracy tended to increase as the thresholds for deciding on the suitability metric became higher. However, this does not necessarily indicate that the higher threshold is more suitable for use in practice, as one would expect that when the threshold is higher then (for those configurations allocating greater amount of resource) fewer configurations will end up being labelled as suitable for a given workload and so there may be a risk that the model parameters of the machine learning model become over fitted to a relatively small number of training examples and may be less representative of patterns that can be detected across a wide class of workloads. A higher threshold implies less opportunity for utilising inter-core borrowing and so it may be preferred to use a lower threshold and tolerate a slightly lower prediction accuracy. It may also help to provide different thresholds for evaluating the configurations with more and less resource, as for configurations with less resource the overfitting problem may arise for the lower thresholds more than the higher thresholds (the opposite relationship to the configurations with more resource).

FIG. 13 also shows that the configurations which involve inter-core borrowing of only one type of resource (the resource configurations shown in the left hand six examples in each portion of FIG. 13) tend to have a greater accuracy than the resource configurations which vary multiple different resource types simultaneously (the right hand six examples in each of the three portions of FIG. 13), although there is still some variation from configuration to configuration. This may suggest that although the examples discussed above which use a single model to provide a multi-class classification or multi-label classification to select between multiple different resource configurations varying across different resource parameters can be successful, it may be possible that greater accuracy can be achieved if multiple separate machine learning models are each trained to determine suitability of settings for a single type of resource, e.g. one model predicting the amount of cache resource that could be used while another model may predict the amount of pipeline width or another parameter affecting resource allocation. By executing the processing discussed above separately for each different type of resource then this could allow bespoke thresholds and sets of model parameters to be selected per resource type to provide greater accuracy. Hence, it is not essential that the various configurations available for prediction by a single instance of the machine learning model should vary across multiple resource types as it may be possible to use different machine learning models for each different resource type.

Nevertheless, in general the accuracy for most of the machine learning models used is shown in FIG. 13 to be above 80% for most configurations and this may provide a reasonable chance of improving overall performance speedup when executing pairs of workloads. Of course this was a relatively simple analysis based on a limited set of configurations but real systems supporting 3D fusion may support much greater alternative resource configurations and so the value of the machine learning may be greater where the complexity of the control decisions becomes higher.

Confusion matrices were determined for the respective model types, when averaged across a subset of the configurations running pairs of workloads (in this example, the four configurations considered for the confusion matrices were the configurations where 1) CPU #0 has 0.75× cache and CPU #1 has 1.25× cache, 2) CPU #0 has 1.25× window and CPU #1 has 0.75× window, 3) CPU #0 has 1.25× cache, 1.25× window and CPU #1 has 0.75× cache and 0.75× window, and 4) CPU #0 has 0.75× cache and 1.25× window while CPU #1 has 1.25× cache and 0.75× window). The confusion matrices were as follows:

| AdaBoost | Predicted: Fuse | Predicted: No fuse |
|---|---|---|
| Truth: Fuse | 0.369 | 0.631 |
| Truth: No fuse | 0.045 | 0.955 |

| MLP | Predicted: Fuse | Predicted: No fuse |
|---|---|---|
| Truth: Fuse | 0.578 | 0.422 |
| Truth: No fuse | 0.107 | 0.893 |

| Gaussian NB | Predicted: Fuse | Predicted: No fuse |
|---|---|---|
| Truth: Fuse | 0.551 | 0.449 |
| Truth: No fuse | 0.197 | 0.803 |

| Decision Tree | Predicted: Fuse | Predicted: No fuse |
|---|---|---|
| Truth: Fuse | 0.469 | 0.531 |
| Truth: No fuse | 0.042 | 0.958 |

| Gradient Boosting | Predicted: Fuse | Predicted: No fuse |
|---|---|---|
| Truth: Fuse | 0.520 | 0.480 |
| Truth: No fuse | 0.017 | 0.983 |

| Random Forest | Predicted: Fuse | Predicted: No fuse |
|---|---|---|
| Truth: Fuse | 0.757 | 0.243 |
| Truth: No fuse | 0.027 | 0.973 |

The confusion matrix shows the rates of how well each label (in this case, Fuse or NoFuse) is predicted, averaged across all configurations. For example, for AdaBoost 95.5% of the NoFuse cases are predicted accurately, but only 36.9% of the Fuse cases are predicted accurately. The lower left entries represent the cases where partial-fusing does not bring any benefits but are mistakenly predicted to fuse (false positive rate). The upper right entries represent to cases where partial fusing would have been beneficial, but the model predicted not to fuse (false negative rate); in other words, the missed opportunities. Most models we evaluated have decently low false positive rates, thus, successfully filtering out most negative fusing decisions, but many have high false negative rates, not being able to capture all fusing opportunities. Gradient boosting has the best false positive rate, but still missed 48% of the opportunities. Random forest has the best balance all around (2.7% false positive rate and 75.7% of the fusing opportunities seized).

Figure 14:
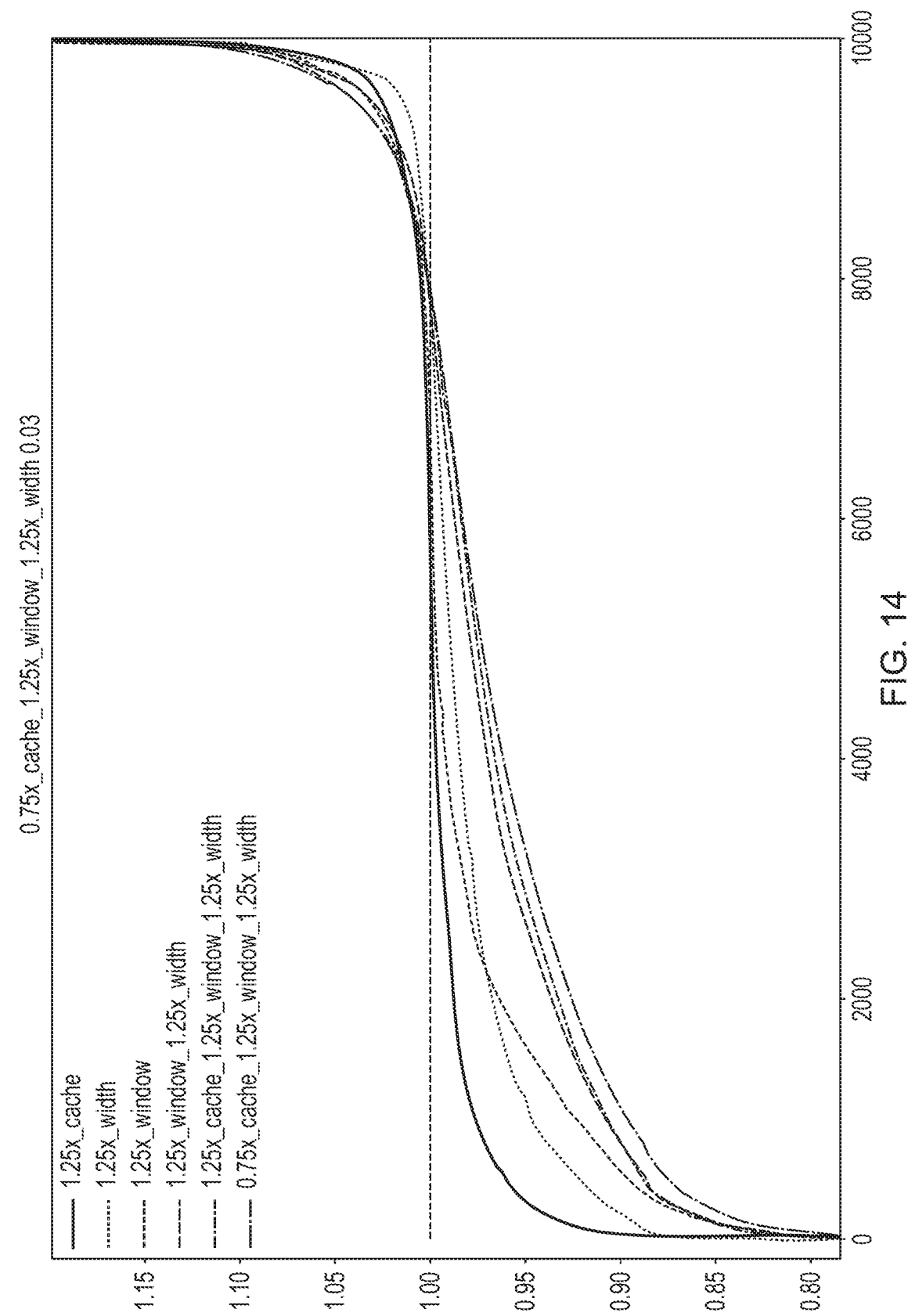
FIGS. 14 and 15 are graphs showing S curves indicating how pairing workloads with differing performance requirements can increase the likelihood that a hardware resource configuration involving inter-core borrowing is able to provide a performance improvement relative to a base configuration in which there is no inter-core borrowing of hardware resource.
Figure 15:
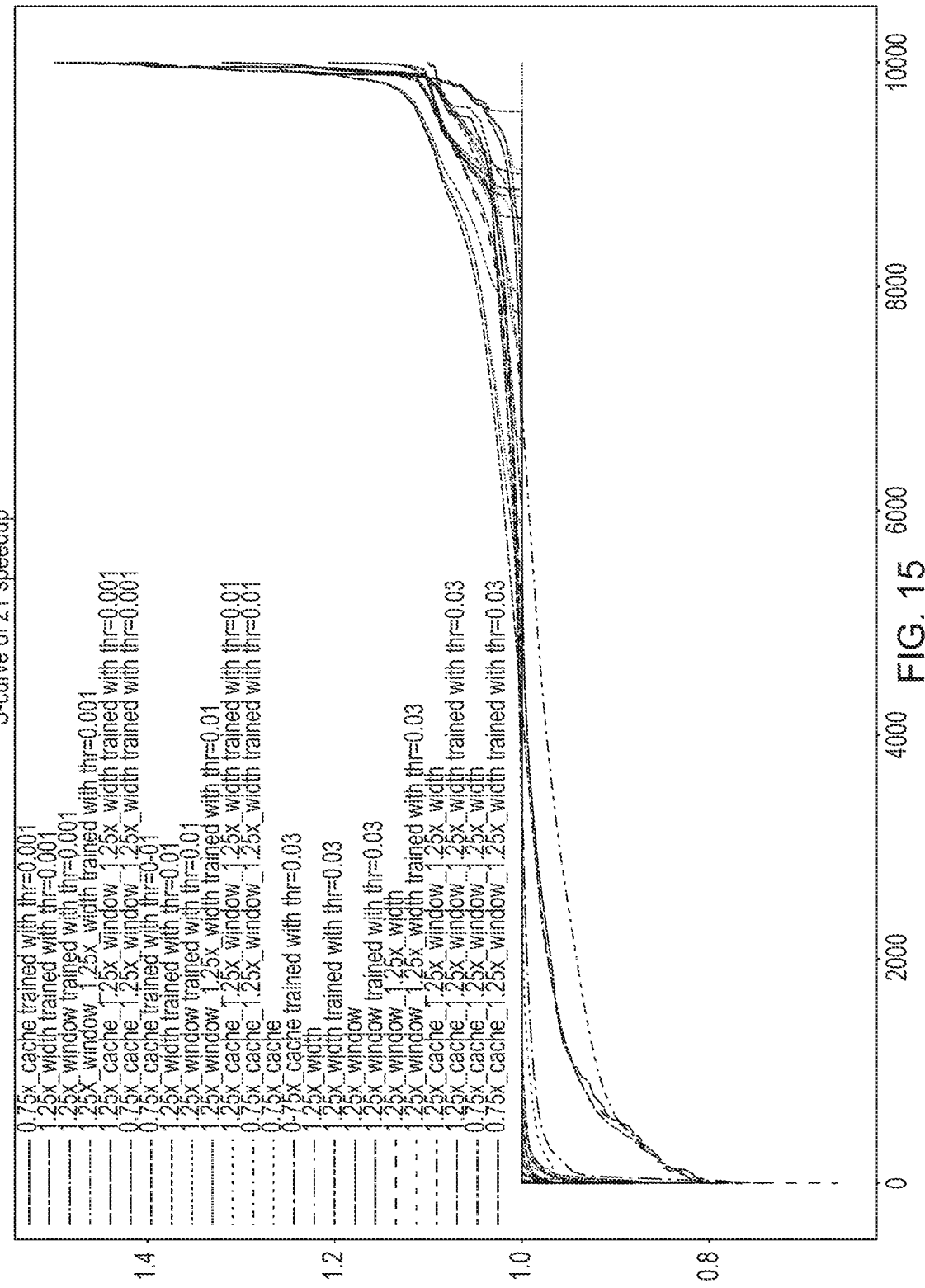

FIGS. 14 and 15 are graphs indicating why the selection of groups of workloads to favour grouping together workloads with differing performance requirements can be beneficial. FIGS. 14 and 15 provide "S curves" which are based on analysing which pairs of workloads handled in the investigation discussed with respect to FIG. 13 benefitted from a performance speedup relative to the base configuration when using one of the alternative resource configurations which support inter-core borrowing of resource. FIGS. 14 and 15 show different S curves for respective configuration types with different amounts of resource allocated. The x axis in FIG. 14 is a cumulative count of the different pairs of workloads for which the performance speedup in the corresponding hardware resource configuration was analysed. The workload pairs are ordered in terms of their performance boost or drop relative to the base configuration, with workload pair 0 having the greatest performance drop and workload pair 10,000 having the highest performance improvement. They axis in FIGS. 14 and 15 shows the performance speedup or drop relative to the base configuration when the corresponding workload pair is executed in the particular hardware resource configuration represented by the line for a given S curve. The different S curves correspond to different hardware resource configurations. FIGS. 14 and 15 are not intended to provide an analysis of which hardware resource configurations may perform better or worse, and so the particular mapping of which resource configurations are represented by each line is not particularly important for this purpose. The purpose of FIGS. 14 and 15 is to compare the S curves which results when workloads are randomly paired together as shown in FIG. 14 compared to the S curves which arise when pairs of workloads are intentionally selected to pair workloads with different performance requirements, e.g. a compute-bound workload with a memory-bound workload in the example of FIG. 15. Here, a compute-bound workload is defined as a high-IPC workload for which the IPC (instructions processed per cycle) is be greater than a threshold (e.g. the threshold may be 2.5), and a memory-bound workload is considered to be one for which a cache miss metric (in this case the number of level 2 cache misses per 1000 instructions) is greater than a certain threshold (for example 20). Hence, for the analysis in FIG. 15, rather than randomly pairing the workloads together, each pair comprises one compute-bound workload and one memory-bound workload.

In the example of FIG. 14 where the pairs of workloads are selected randomly, the point at which the S curves crosses y=1 (the boundary marked with the dotted line where performance is the same as in the base configuration) is shifted towards the right of graph so that there are relatively few pairs of workloads (only the top ~2000 pairs) which see a performance speedup from using one of the configurations with inter-core borrowing while the remaining 8000 pairs of workloads either see substantially the same performance as the base configuration or see a performance drop.

In contrast, as shown in FIG. 15 when workloads are paired together with different performance requirements, by pairing a compute-bound workload with a memory-bound workload in this example, the point at which the S curves cross the y=1 line is shifted to the left and now a much greater number of workload pairs can see a performance improvement from the respective configurations involving inter-core borrowing. Hence, this shows that if a step of selecting workload groups to pair together workloads with differing performance requirements is performed before forming the input data for the model, so that the model predicts suitable hardware resource configurations for those pairs intentionally selected to have different performance requirements, this may make it much more likely that a range of hardware resource configurations can be identified as suitable which permit more inter-core borrowing, and this may therefore make it more likely that overall performance for the system can be improved and greater utilisation of available hardware resources is possible.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. A computer-implemented method for controlling hardware resource configuration for a processing system comprising a plurality of processor cores, the method comprising:

obtaining, by a computing system, performance monitoring data indicative of processing performance associated with workloads to be executed on the processing system, wherein:

the processing system is configured to support a first processor core of the plurality of processor cores processing a workload using borrowed hardware resource of a second processor core of the plurality of processor cores, the processing system being configured to support a plurality of alternative hardware resource configurations corresponding to different amounts of inter-core borrowing of hardware resources between the plurality of processor cores; and the performance monitoring data comprises a first set of performance monitoring data corresponding to a first workload to be executed on the first processor core and a second set of performance monitoring data corresponding to a second workload to be executed on the second processor core;

generating, by the computing system, based on the first set of performance monitoring data corresponding to the first workload to be executed on the first processor core and the second set of performance monitoring data corresponding to the second workload to be executed on the second processor core, input data for a trained machine learning model, the trained machine learning model being arranged to output an inference identifying at least one of the plurality of alternative hardware resource configurations corresponding to an amount of inter-core borrowing of hardware resources that is suitable for executing the first workload on the first processor core and the second workload on the second processor core;

providing, by the computing system, the input data to the trained machine learning model; and responsive to the inference output by the trained machine learning model in response to the input data, the computing system configuring the processing system, using control information, to control, based on the at least one hardware resource configuration identified by the inference, an amount of inter-core borrowing of hardware resource between the plurality of processor cores.

2. The method of claim 1, in which:

in at least one of the plurality of alternative hardware resource configurations selectable based on the inference made by the trained machine learning model, a first subset of hardware resource of a given processor core of the plurality of processor cores is allocated for use by one or more workloads executed at the given processor core, and a second subset of hardware resource of the given processor core is not allocated for use by the one or more workloads executed at the given processor core, wherein the first subset is different from the second subset.

3. The method of claim 1, in which the input data for the trained machine learning model comprises at least one event count difference value, each event count difference value indicative of a difference between corresponding performance counter values obtained for the first workload to be executed on the first processor core and the second workload to be executed on the second processor core.

4. The method of claim 3, in which the method comprises reading, by the computing system, the at least one event count difference value from at least one event count difference storage element provided in hardware in the processing system, the processing system comprising hardware circuit logic to maintain the at least one event count difference value stored in the at least one event count difference storage element.

5. The method of claim 3, in which the input data for the trained machine learning model also comprises at least one event count magnitude value indicative of a magnitude of at least one of the corresponding performance counter values.

6. The method of claim 1, comprising selecting, by the computing system, a group of workloads to execute in parallel on respective processor cores of the processing system, based on at least one selection criterion which favours grouping together of workloads for which the performance monitoring data indicates that the workloads have differing performance or resource utilisation requirements.

7. The method of claim 1, in which the input data for the trained machine learning model also comprises one or more of:
a workload identifier identifying at least one workload to be executed on the processing system; and
a workload type indication indicative of a workload type of said at least one workload.

8. The method of claim 1, in which
the inference made by the trained machine learning model comprises a configuration suitability indication indicative of the at least one of a plurality of alternative hardware resource configurations as a suitable hardware resource configuration for executing at least one workload.

9. The method of claim 1, in which the inference is capable of indicating two or more of the plurality of alternative hardware resource configurations as each being suitable hardware resource configurations for executing at least one workload.

10. The method of claim 9, comprising:
in response to determining that the inference indicates at least two of the plurality of alternative hardware resource configurations as each being suitable hardware resource configurations for executing the at least one workload, selecting, by the computing system, between said at least two alternative hardware resource configurations based on at least one selection criterion,
where the at least one selection criterion includes at least one of:
a first selection criterion to prioritise selection of one of said at least two of the plurality of alternative hardware resource configurations with lower expected power consumption in preference to another of said at least two of the plurality of alternative hardware resource configurations with higher expected power consumption;
a second selection criterion to prioritise selection of one of said at least two of the plurality of alternative hardware resource configurations with higher expected performance in preference to another of said at least two of the plurality of alternative hardware resource configurations with lower expected performance;
a third selection criterion to prioritise selection of one of said at least two of the plurality of alternative hardware resource configurations with a greater amount of inter-core borrowing of hardware resources in preference to another of said at least two of the plurality of alternative hardware resource configurations with a smaller amount of inter-core borrowing of hardware resources;
a fourth selection criterion to prioritise selection of one of said at least two of the plurality of alternative hardware resource configurations with a smaller amount of inter-core borrowing of hardware resources between processor cores in preference to another of said at least two of the plurality of alternative hardware resource configurations with a greater amount of inter-core borrowing of hardware resources between processor cores; and
a fifth selection criterion to prioritise selection of one of said at least two of the plurality of alternative hardware resource configurations which requires less change in hardware resource configuration relative to a current hardware resource configuration in preference to another of said at least two of the plurality of alternative hardware resource configurations which requires more change in hardware resource configuration relative to the current hardware resource configuration.

11. The method of claim 1, in which the control information comprises configuration parameters for controlling allocation of at least two different types of hardware resource of the processing system.

12. The method of claim 1, in which the control information specifies configuration of at least one type of hardware resource, said at least one type of hardware resource comprising one or more of:
instruction queue storage capacity;
fetch, decode or issue slots for fetching, decoding or issuing an instruction;
at least one execution unit for executing processing operations in response to instructions;
MAC units;
shader cores;
register storage;
reorder buffer capacity in a reorder buffer for tracking commitment of instructions executed out-of-order in an out-of-order processing pipeline;
cache storage capacity;
tightly coupled memory;
buffers;
translation lookaside buffer storage capacity; and
branch prediction state storage capacity.

13. The method of claim 1, in which the plurality of processor cores are provided on different layers of a three-dimensional integrated circuit.

14. The method of claim 1, in which the processing system comprises three or more processor cores;
and
the plurality of alternative hardware resource configurations restrict borrowing of resource between respective pairs of processor cores to limit which pairs or groups of processor cores are allowed to borrow hardware resource from each other when the processing system is operating in a state in which the three or more processor cores are configured to execute at least two distinct workloads.

15. The method of claim 1, in which the performance monitoring data is gathered by performance monitoring circuitry of the processing system.

16. The method of claim 1, in which the computing system is included in the processing system or is separate from the processing system.

17. A non-transitory storage medium storing a computer program for controlling a processing system to perform the method of claim 1.

18. A computer-implemented training method for training a machine learning model for controlling hardware resource configuration for a processing system comprising a plurality of processor cores; the method comprising:
for each of a plurality of workloads or groups of workloads selected as a selected workload or selected group of workloads, performing, by a computing system, a training operation comprising:

obtaining performance monitoring data indicative of processing performance for the selected workload or selected group of workloads processed in a plurality of different hardware resource configurations of the plurality of processor cores, the plurality of hardware resource configurations corresponding to different amounts of inter-core borrowing of hardware resources between the plurality of processor cores;

training the machine learning model to adapt model parameters for the machine learning model based on the performance monitoring data for the selected workload or selected group of workloads and the plurality of different hardware resource configurations, wherein the performance monitoring data used for training the machine learning model include at least a first of performance monitoring data corresponding to a first workload to be executed on a first processor core from the plurality of processor cores and a second set of performance corresponding to a second workload to be executed on a second processor core from the plurality of processor cores; and recording in memory, by the computing system, trained model parameters for the machine learning model resulting from the training operation performed for the plurality of workloads or groups of workloads, wherein the trained model parameters comprise information indicating an amount of inter-core borrowing of hardware resources that is suitable for executing the first workload on the first processor core and the second workload on the second processor core, wherein the computing system is included in the processing system or is separate from the processing system.

19. A non-transitory storage medium storing a computer program for controlling a processing system to perform the method of claim 18.

20. A processing system comprising:

a plurality of processor cores, the plurality of processor cores comprising a first processor core and a second processor core and the processing system being configured to support the first processor core processing a workload using borrowed hardware resource of the second processor core, wherein the processing system is configured to support a plurality of alternative hardware resource configurations corresponding to different amounts of inter-core borrowing of hardware resources between the plurality of processor cores;

performance monitoring circuitry configured to obtain performance monitoring data indicative of processing performance associated with workloads to be executed on the processing system, the performance monitoring data comprising a first set of performance monitoring data corresponding to a first workload to be executed on the first processor core and a second set of performance monitoring data corresponding to a second workload to be executed on the second processor core;

circuitry to generate, based on the first set of performance monitoring data corresponding to the first workload to be executed on the first processor core and the second set of performance monitoring data corresponding to the second workload to be executed on the second processor core, input data for a trained machine learning model, the trained machine learning model being arranged to output an inference identifying at least one of the plurality of alternative hardware resource configurations corresponding to an amount of inter-core borrowing of hardware resources that is suitable for executing the first workload on the first processor core and the second workload on the second processor core;

circuitry to provide the input data to the trained machine learning model; and configuration control circuitry responsive to the inference output by the trained machine learning model in response to the input data, to control, based on the at least one hardware resource configuration identified by the inference, an amount of inter-core borrowing of hardware resource between the plurality of processor cores.

* * * * *